US012706536B2

(12) United States Patent
Brown et al.

(10) Patent No.: US 12,706,536 B2
(45) Date of Patent: Aug. 11, 2026

(54) 2-LEVEL BUCK-BOOST DC-TO-DC CONVERTERS WITH VIRTUAL GROUNDS

(71) Applicant: Komatsu America Corp., Chicago, IL (US)

(72) Inventors: Gerald Murray Brown, Cedarville, OH (US); Hossein Dehnavifard, Pittsburgh, PA (US); Muhammad Barkat Saifee, Peoria, IL (US)

(73) Assignee: KOMATSU AMERICA CORP., Chicago, IL (US)

( * ) Notice: Subject to any disclaimer, the term of this patent is extended or adjusted under 35 U.S.C. 154(b) by 754 days.

(21) Appl. No.: 18/310,137

(22) Filed: May 1, 2023

(65) Prior Publication Data

US 2023/0369978 A1 Nov. 16, 2023

Related U.S. Application Data

(60) Provisional application No. 63/342,369, filed on May 16, 2022.

(51) Int. Cl.

| | |
|---|---|
| ***H02M 3/158*** | (2006.01) |
| ***B60L 53/22*** | (2019.01) |
| ***H02J 7/50*** | (2026.01) |
| ***H02M 1/00*** | (2006.01) |

(52) U.S. Cl.

CPC ........... *H02M 3/1582* (2013.01); *B60L 53/22* (2019.02); *H02J 7/50* (2026.01); *H02M 1/0067* (2021.05); *B60L 2210/12* (2013.01); *B60L 2210/14* (2013.01); *H02J 2207/20* (2020.01)

(58) Field of Classification Search

CPC .................................................. H02M 3/1582
USPC ......................................................... 320/107
See application file for complete search history.

(56) References Cited

U.S. PATENT DOCUMENTS

2012/0169126 A1* 7/2012 Totterman ........... H02M 3/1582 323/283
2018/0069429 A1* 3/2018 Marbach .................. H02J 3/28

* cited by examiner

*Primary Examiner* — Ahmed H Omar
(74) *Attorney, Agent, or Firm* — Husch Blackwell LLP

(57) ABSTRACT

A conversion circuit is disclosed and includes a DC link, a first DC-to-DC converter, an inverter and a second inverter. The DC link includes DC link rails. The first DC-to-DC converter includes a first phase leg and a second phase leg. The first reactor is connected between a first center terminal of the first phase leg and at least one energy storage module. The second reactor is connected between a second center terminal of the second phase leg and the at least one energy storage module. The first reactor, the at least one energy storage module and the second reactor are connected in series between the first center terminal and the second center terminal such that the first DC-to-DC converter has a virtual ground.

36 Claims, 11 Drawing Sheets

Engine
ALT
Field Regulator
Rectifier
Line Reactor
Trolley Box
First DC-to-DC Converter
Second DC-to-DC Converter
Discharge Grounding Circuit
Inverter
Load
Reactor Set
Contactor
Disconnector
Energy Storage Module
Group(s) of Energy Storage Modules
Control Module
Sensors
100
102
104
106
107
108
110
112
114
120
122
124
126
126A
126B
130
132
134
135
136
137
138
139
140
141
142
143
144
145
146
148
150
152
160
162
170

2-LEVEL BUCK-BOOST DC-TO-DC CONVERTERS WITH VIRTUAL GROUNDS

CROSS-REFERENCE TO RELATED APPLICATIONS

This application claims the benefit of U.S. Provisional Application No. 63/342,369, filed on May 16, 2022. The entire disclosure of the above application is incorporated herein by reference.

FIELD

The present disclosure relates to direct current (DC)-to-DC converters within power supply systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply system for a vehicle may include, for example, one or more power sources such as an engine, a trolly power circuit, and/or one or more battery packs providing DC power to DC bus bars. A trolley power circuit refers to a circuit for converting DC voltage on overhead trolley lines to a DC voltage across the DC bus bars. One or more inverters convert the DC voltage across the DC bus bars to one or more alternating current (AC) voltages, which are supplied respectively to one or more loads. The loads may include motors, fans, brake choppers, etc.

SUMMARY

A conversion circuit is disclosed and includes a DC link, a first DC-to-DC converter, an inverter and a second inverter. The DC link includes DC link rails. The first DC-to-DC converter includes a first phase leg and a second phase leg. The first reactor is connected between a first center terminal of the first phase leg and at least one energy storage module. The second reactor is connected between a second center terminal of the second phase leg and the at least one energy storage module. The first reactor, the at least one energy storage module and the second reactor are connected in series between the first center terminal and the second center terminal such that the first DC-to-DC converter has a virtual ground.

In other features, the at least one energy storage module is connected between the first reactor and the second reactor. The virtual ground is centered between the first reactor and the second reactor.

In other features, the at least one energy storage module includes a first energy storage module and a second energy storage module. The virtual ground is centered between the first energy storage module and the second energy storage module.

In other features, the virtual ground is at a voltage potential between voltage potentials of the DC link rails. The DC link rails are not connected to a ground reference terminal.

In other features, the virtual ground is not at a voltage potential of a chassis ground. In other features, the virtual ground refers to a voltage potential between at least one of (i) voltage potentials of the DC link rails, or (ii) positive and negative voltage potentials of the at least one energy storage module.

In other features, the first reactor is connected between the first center terminal of the first phase leg and a group of energy storage modules, the group of energy storage modules including the at least one energy storage module. The second reactor is connected between the second center terminal of the second phase leg and the group of energy storage modules. The first reactor, the group of energy storage modules and the second reactor are connected in series between the first center terminal and the second center terminal.

In other features, the group of energy storage modules includes a first energy storage module and a second energy storage module connected in series. The virtual ground is at a voltage potential equal to a voltage potential of a connection point between the first energy storage module and the second energy storage module. The connection point is not connected to a reference ground terminal.

In other features, the first phase leg includes a first set of serially connected switch-diode pairs and the second phase leg includes a second set of serially connected switch-diode pairs.

In other features, the first DC-to-DC converter is implemented as a 2-level buck-boost DC-to-DC converter.

In other features, the conversion circuit further includes: a second DC-to-DC converter including a first phase leg; a third reactor connected between a third center terminal of a third phase leg of the first DC-to-DC converter and the at least one energy storage module; a fourth reactor connected between a center terminal of the first phase leg of the second DC-to-DC converter and the at least one energy storage module; and a control module configured to control (i) interleaved operation of switches of the first phase leg of the first DC-to-DC converter and switches of the second phase leg of the first DC-to-DC converter, and (ii) interleaved operation of switches of the third phase leg of the first DC-to-DC converter and switches of the first phase leg of the second DC-to-DC converter.

In other features, the conversion circuit further includes: a second DC-to-DC converter including a first phase leg and a second phase leg; a third reactor connected between a first center terminal of the first phase leg of the second DC-to-DC converter and the at least one energy storage module; a fourth reactor connected between a second center terminal of the second phase leg of the second DC-to-DC converter and the at least one energy storage module; and a control module configured to control (i) interleaved operation of switches of the first phase leg of the first DC-to-DC converter and switches of the second phase leg of the first DC-to-DC converter, and (ii) interleaved operation of switches of the first phase leg of the second DC-to-DC converter and switches of the second phase leg of the second DC-to-DC converter.

In other features, the conversion circuit further includes: a second DC-to-DC converter including a first phase leg and a second phase leg; a third reactor connected between a first center terminal of the first phase leg of the second DC-to-DC converter and one or more additional energy storage modules; and a fourth reactor connected between a second center terminal of the second phase leg of the second DC-to-DC converter and the one or more additional energy storage modules. The third reactor, the one or more additional energy storage modules and the fourth reactor are connected in series between the first center terminal of the first phase leg of the second DC-to-DC converter and the second center terminal of the second phase leg of the second DC-to-DC converter such that the second DC-to-DC converter has another virtual ground.

In other features, the conversion circuit further includes a control module configured to control switches of the first phase leg and the second phase leg of the first DC-to-DC converter and control switches of the first phase leg and the second phase leg of the second DC-to-DC converter for staggered operation of the at least one energy storage module and the one or more additional energy storage modules.

In other features, the conversion circuit further includes: a second DC-to-DC converter including a phase leg, where the first DC-to-DC converter includes a third phase leg; a third reactor connected between a third center terminal of the third phase leg of the first DC-to-DC converter and one or more additional energy storage modules; and a fourth reactor connected between a center terminal of the phase leg of the second DC-to-DC converter and the one or more additional energy storage modules. The third reactor, the one or more additional energy storage modules and the fourth reactor are connected in series between the third center terminal of the third phase leg of the first DC-to-DC converter and the center terminal of the phase leg of the second DC-to-DC converter to provide another virtual ground.

In other features, the conversion circuit further includes a control module configured to control switches of the first phase leg, the second phase leg and the third phase leg of the first DC-to-DC converter and control switches of the phase leg and the second DC-to-DC converter for staggered operation of the at least one energy storage module and the one or more additional energy storage modules.

In other features, the conversion circuit further includes: a second DC-to-DC converter including a first phase leg; a third DC-to-DC converter including a first phase leg; a third reactor connected between a first center terminal of the first phase leg of the second DC-to-DC converter and one or more additional energy storage modules; and a fourth reactor connected between a first center terminal of the first phase leg of the third DC-to-DC converter and the one or more additional energy storage modules, where the third reactor, the one or more additional energy storage modules and the fourth reactor are connected in series between the first center terminal of the first phase leg of the second DC-to-DC converter and the first center terminal of the first phase leg of the third DC-to-DC converter to provide another virtual ground.

In other features, the conversion circuit further includes a control module configured to control switches of the first phase leg and the second phase leg of the first DC-to-DC converter, control switches of the first phase leg of the second DC-to-DC converter, and control switches of the first phase leg of the third DC-to-DC converter for staggered operation of the at least one energy storage module and the one or more additional energy storage modules.

In other features, the conversion circuit further includes a fifth reactor. The second DC-to-DC converter includes a second phase leg. The fifth reactor is connected between a second center terminal of the second phase leg of the second DC-to-DC converter and the at least one energy storage module.

In other features, the conversion circuit further includes a sixth reactor. The second DC-to-DC converter includes a third phase leg. The sixth reactor is connected between a third center terminal of the third phase leg of the second DC-to-DC converter and the at least one energy storage module.

In other features, the conversion circuit further includes a sixth reactor. The third DC-to-DC converter includes a second phase leg. The sixth reactor is connected between a second center terminal of the second phase leg of the third DC-to-DC converter and the at least one energy storage module.

In other features, another conversion circuit is disclosed and includes: a direct current (DC) link including DC link rails; a first DC-to-DC converter including a first phase leg; a second DC-to-DC converter including a first phase leg; a first reactor connected between a first center terminal of the first phase leg of the first DC-to-DC converter and at least one energy storage module; and a second reactor connected between a first center terminal of the first phase leg of the second DC-to-DC converter and the at least one energy storage module. The first reactor, the at least one energy storage module and the second reactor are connected in series between the first center terminal of the first phase leg of the first DC-to-DC converter and the first center terminal of the first phase leg of the second DC-to-DC converter such that the conversion circuit has a virtual ground.

In other features, the conversion circuit further includes a third reactor. The first DC-to-DC converter includes a second phase leg. The third reactor is connected between a second center terminal of the second phase leg of the first DC-to-DC converter and the at least one energy storage module.

In other features, the conversion circuit further includes a fourth reactor. The first DC-to-DC converter includes a third phase leg. The fourth reactor is connected between a third center terminal of the third phase leg of the first DC-to-DC converter and the at least one energy storage module.

In other features, the conversion circuit further includes a fourth reactor. The second DC-to-DC converter includes a second phase leg. The fourth reactor is connected between a second center terminal of the second phase leg of the second DC-to-DC converter and the at least one energy storage module.

In other features, the conversion circuit further includes: a third DC-to-DC converter including a first phase leg and a second phase leg; a third reactor connected between a first center terminal of the first phase leg of the third DC-to-DC converter and one or more additional energy storage modules; a fourth reactor connected between a second center terminal of the second phase leg of the third DC-to-DC converter and the one or more additional energy storage modules. The third reactor, the one or more additional energy storage modules and the fourth reactor are connected in series between the first center terminal of the first phase leg of the third DC-to-DC converter and the second center terminal of the second phase leg of the third DC-to-DC converter such that the third DC-to-DC converter has another virtual ground.

In other features, the conversion circuit further includes a control module configured to control switches of the first phase leg of the first DC-to-DC converter, control switches of the first phase leg of the second DC-to-DC converter, and control switches of the first phase leg and the second phase leg of the third DC-to-DC converter for staggered operation of the at least one energy storage module and the one or more additional energy storage modules.

In other features, the virtual ground is at a voltage potential between voltage potentials of the DC link rails. The DC link rails are not connected to a ground reference terminal.

In other features, the virtual ground is not at a voltage potential of a chassis ground. In other features, the virtual ground refers to a voltage potential between at least one of (i) voltage potentials of the DC link rails, or (ii) positive and negative voltage potentials of the at least one energy storage module.

In other features, the first reactor is connected between the first center terminal of the first phase leg of the first DC-to-DC converter and a group of energy storage modules, the group of energy storage modules including the at least one energy storage module. The second reactor is connected between the first center terminal of the first phase leg of the second DC-to-DC converter and the group of energy storage modules. The first reactor, the group of energy storage modules and the second reactor are connected in series between the first center terminal of the first phase leg of the first DC-to-DC converter and the first center terminal of the first phase leg of the second DC-to-DC converter.

In other features, the group of energy storage modules includes a first energy storage module and a second energy storage module connected in series. The virtual ground is at a voltage potential equal to a voltage potential of a connection point between the first energy storage module and the second energy storage module. The connection point is not connected to a reference ground terminal.

In other features, the first phase leg of the first DC-to-DC converter includes a first set of serially connected switch-diode pairs. The first phase leg of the second DC-to-DC converter includes a second set of serially connected switch-diode pairs.

In other features, each of the first DC-to-DC converter and the second DC-to-DC converter is implemented as a 2-level buck-boost DC-to-DC converter.

In other features, the conversion circuit further includes a control module, a third reactor and a fourth reactor. The first DC-to-DC converter includes a second phase leg. The second DC-to-DC converter includes a second phase leg. The third reactor is connected between a second center terminal of the second phase leg of the first DC-to-DC converter and the at least one energy storage module. The fourth reactor is connected between the second center terminal of the second phase leg of the second DC-to-DC converter and the at least one energy storage module. The control module is configured to control (i) interleaved operation of switches of the first phase leg of the first DC-to-DC converter and switches of the first phase leg of the second DC-to-DC converter, and (ii) interleaved operation of switches of the second phase leg of the first DC-to-DC converter and switches of the second phase leg of the second DC-to-DC converter.

In other features, the conversion further includes: the first DC-to-DC converter includes a second phase leg and a third phase leg; a third reactor connected between a second center terminal of the second phase leg of the first DC-to-DC converter and the at least one energy storage module; a fourth reactor connected between a third center terminal of the third phase leg of the first DC-to-DC converter and the at least one energy storage module; and a control module configured to control (i) interleaved operation of switches of the first phase leg of the first DC-to-DC converter and switches of the third phase leg of the first DC-to-DC converter, and (ii) interleaved operation of switches of the second phase leg of the first DC-to-DC converter and switches of the first phase leg of the second DC-to-DC converter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
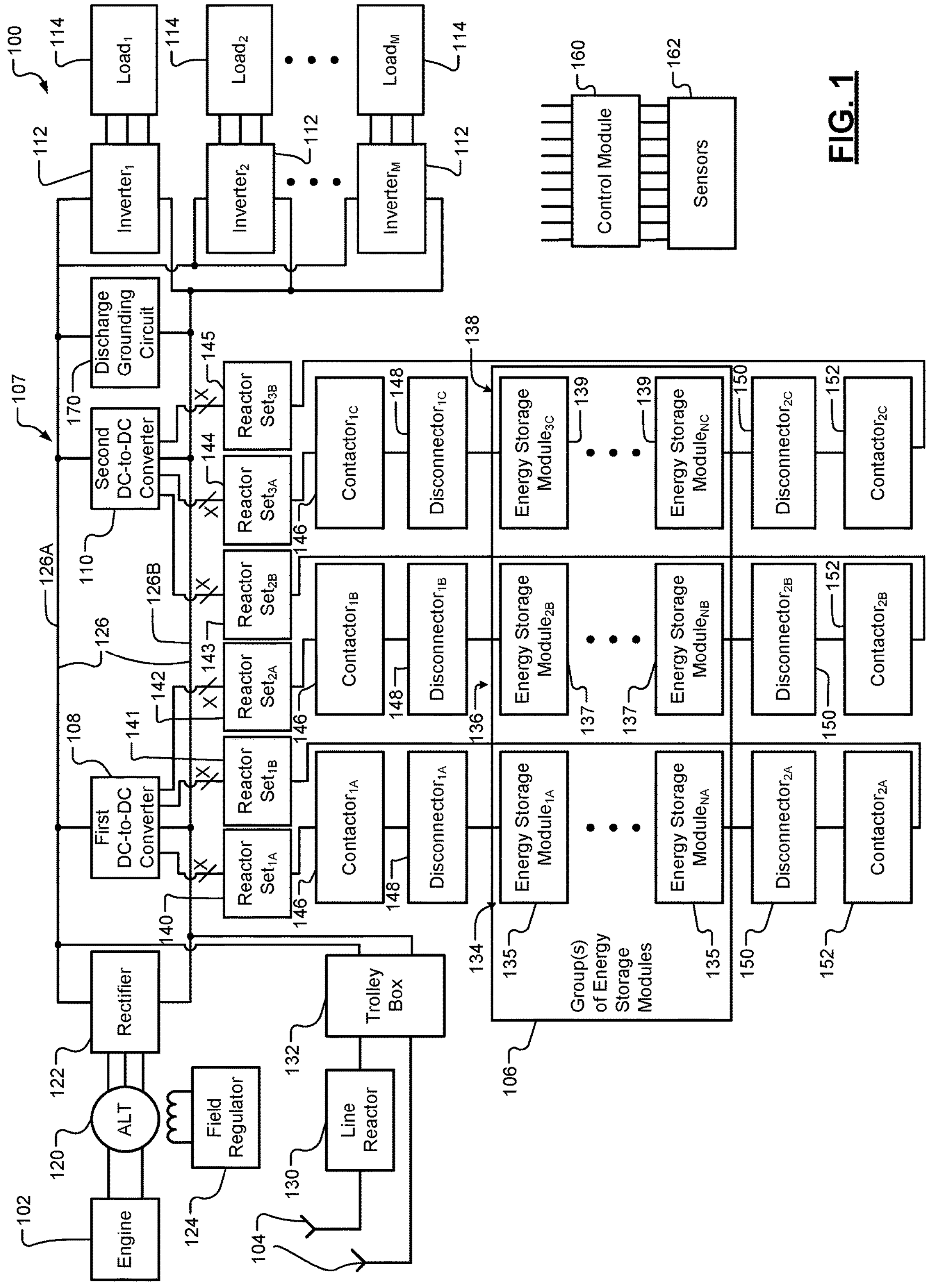
FIG. 1 is a functional block diagram of an example power supply system incorporating 2-level buck-boost DC-to-DC converters in accordance with the present disclosure.

Electric vehicles (EVs), sometimes referred to as zero emission vehicles, can include low-voltage drive systems (e.g., 800 volts (V) or less drive systems). EVs with low-voltage drive systems include low-voltage energy storage modules (ESMs), such as battery packs and/or fuel cells providing up to 800V. Traditional EVs are used in automobiles by individual consumers and businesses for small lightweight and low loading applications. There is a need for zero emission mining and construction vehicles. Mining and construction vehicles can however be large, heavy and have high-power and high DC voltage requirements (e.g., 2800 V). As an example, mining and construction vehicles may receive DC power from overhead DC power lines capable of supplying 2800 V over extended periods of time.

Because of the high-power and DC voltage requirements of mining and construction vehicles, traditional automotive vehicle ESMs are not capable of being used in mining and construction vehicles and/or other high-load high-power requirement applications. Off-highway vehicles, for example, commonly use a 2800 V DC link that far exceeds the voltage ratings of a typical 800 V automotive ESM. The comparatively small market for drive systems of high-load high-power requirement applications is a disincentive for manufacturers to develop suitable ESM insulation systems for ESM modules to allow for use in these types of applications.

A drive system of a high DC voltage application (e.g., a mining, construction or transportation vehicle) can employ a bi-polar DC link including DC bus bars (or rails). The bi-polar DC link has a chassis ground connection located at a mid-point between two discharge resistors. The discharge resistors are connected in series between the bus bars. Each of the discharge resistors has a high impedance (e.g., 10-100 kilo-ohms). This minimizes the maximum voltage at any point in the drive system with respect to ground and as a result reduces insulation requirements. However, to prevent damage to drive system components in the event that one of the DC link rails is shorted to a chassis ground, some components of the drive system need to be configured to withstand a full DC link voltage, which may be up to 2800 V. This prevents use of multiple low-voltage ESMs to provide high-voltages needed for high DC voltage applications.

3-Level and 2-Level DC-to-DC Converters

A DC-to-DC converter includes at least two phase legs, where each phase leg includes two serially connected switch-diode pairs, where each switch-diode pair includes a switch and a diode connected in anti-parallel. The phase legs of the DC-to-DC converter are connected in parallel across DC rails of a DC link.

A conventional 3-level DC-to-DC converter (or buck-boost converter (BBC)) alternately switches an output voltage of each phase leg, measured between switch-diode pairs of that phase leg, between three voltage levels. For a bipolar DC link, with voltages +Vdc/2 and −Vdc/2 that are symmetric with respect to a system ground, each phase leg has an output voltage $V_{phase}$ of +Vdc/2, 0, or −Vdc/2, hence the designation "3-level DC-to-DC converter". These three voltage levels, however, can facilitate five possible voltages between two phase legs such that the instantaneous value of $V_{out}$ can be equal to ±Vdc, ±Vdc/2, or 0. In combination with energy storage elements such as inductors, the average output voltage $V_{out,avg}$ can be lower (buck mode) or higher (boost mode) than the DC link input voltage Vdc. The average output voltage $V_{out,avg}$ can also be negative. In some embodiments the BBC can facilitate bidirectional current flow. For example, a bidirectional 3-level BBC can operate as a buck converter when current flows from a DC link to a lower voltage ESM and as a boost converter when current flows from a lower voltage ESM to a higher voltage DC link.

A conventional 3-level DC-to-DC converter having a 3-level topology with bidirectional current flow as described can safely couple a low-voltage ESM to a high-voltage DC link because the ESM is operated at a chassis ground voltage. The 3-level topology provides low ripple currents with relatively small filter inductors. However, both a capacitor connected across the DC link and the ESM require mid-point connections to chassis ground that can carry the full ESM current. 3-level DC-to-DC converters also tend to be costly.

A conventional 2-level DC-to-DC converter (or BBC) continuously switches an output voltage of each phase leg between two voltage levels. For a bipolar DC link, with voltages +Vdc/2 and −Vdc/2 that are symmetric with respect to a system ground, each phase leg has an output voltage $V_{phase}$ of either +Vdc/2 or −Vdc/2, hence the designation "2-level DC-to-DC converter". The resulting instantaneous output voltage $V_{out}$ between two phase legs, with symmetric operation of each phase leg, is $V_{out}$=±Vdc, and is symmetric with respect to the DC link ground voltage. In combination with energy storage elements such as inductors, the average output voltage $V_{out,avg}$ can be lower (buck mode) or higher (boost mode) than the DC link input voltage Vdc. The average output voltage $V_{out,avg}$ can also be negative. In addition, a BBC with bidirectional current capability can conduct current from a higher voltage DC link to a lower voltage ESM (buck operation) and conduct current from an ESM up to a higher voltage DC link (boost operation).

Conventional 2-level DC-to-DC converters having a 2-level topology are less expensive than 3-level DC-to-DC converters, but have higher ripple currents for similarly sized filter inductors. Use of a 2-level DC-to-DC converter for high-voltage vehicle applications is generally not possible because the potential voltages experienced by the DC-to-DC converter exceed the insulation voltage ratings of low-voltage ESMs. This is true even though the ESM voltage levels do not exceed the insulation voltage ratings during normal operation. When a ground fault arises (e.g., a short circuit) the insulation voltage ratings of the DC-to-DC converter can be exceeded. For example, the positive terminal of an 800 V battery with the negative terminal connected to a negative DC link rail of a bipolar 2600 V DC link sits at −1300 V during normal operation. A hard ground fault on the positive DC link rail drives the negative terminal of the battery to −2600 V, which can result in the voltage across the battery exceeding the insulation voltage rating of the battery. Although operation at −1300 V may not exceed the insulation voltage rating of the battery when a fault condition does not exist, operation at the −2600 V typically does exceed the insulation voltage rating and can cause damage to the insulation of the battery (ESM). For these reasons, 2-level DC-to-DC converters have traditionally been limited to low-voltage applications.

A conventional 2-level DC-to-DC converter, having a bipolar DC link and symmetrical phase leg operation, has a simple and efficient configuration. By avoiding unsymmetrical operation, the average output voltage of the 2-level DC-to-DC converter floats with respect to ground and minimizes the voltage stress on a corresponding output circuit with respect to ground. The occurrence of ground faults on the positive or negative DC rails of the DC link, however, can lead to high voltage stresses with respect to ground on the load connected to the output terminals of the 2-level DC-to-DC converter.

The examples set forth herein include power supply systems that include 2-level buck-boost DC-to-DC converters with virtual grounds (also referred to as "virtual load grounds" and "floating grounds"). A virtual ground may ensure that a load voltage, depending on the configuration of the 2-level DC-to-DC converter, is not only floating but is centered symmetrically about a ground voltage. A virtual ground refers to (i) a voltage potential between voltage potentials of DC link rails, and (ii) a voltage potential between positive and negative voltage potentials of at least one energy storage module. A virtual ground may refer to at least one of (i) a voltage potential half way between voltage potentials of DC link rails (or (Vlink++Vlink−)/2), and/or (ii) a voltage potential half way between positive and negative voltage potentials (or (Vbat++Vbat−)/2) of at least one ESM, where Vlink+, Vlink−, Vbat+, Vbat− refer respectively to a positive DC link rail voltage, a negative DC link rail voltage, a positive ESM (or battery) voltage and a negative ESM (or battery) voltage.

Although a virtual ground may be at a same voltage potential as a chassis ground, a virtual ground is not a chassis ground and/or earth ground and does not involve a galvanic connection to a chassis ground and/or earth ground. In the disclosed examples, positive and negative DC link rails connected to the DC-to-DC converters are not connected to ground. The 2-level buck-boost DC-to-DC converters are configured to prevent DC link voltages from exceeding insulation voltage ratings of low voltage ESMs and are capable of both buck and boost operations in all four quadrants. The buck operations refer to charging of ESMs (or power sources) and the boost operations refer to discharging of the ESMs.

Buck-boost DC-to-DC converters generally use a filter inductor to smooth phase/high-frequency voltage pulses (or phase leg voltage V) and provide continuous load current with minimal ripple and a relatively smooth average load voltage $V_{load}$, or $V_{bat}$. The filter inductor bridges the voltage difference between a DC link voltage and the lower (buck converter) or higher (boost converter) load voltage. A voltage difference $V_L$ across the inductor L is $V_L=\pm L*di/dt$, depending on the current polarity.

A virtual ground is established by splitting the filter inductor into two equal components and connecting the two inductive components in series with an ESM group (or load) centered between the two inductive components. In this way, the same voltage drop, $V_L/2=(L/2)*di/dt$, occurs before and after the load. For DC-to-DC converters with a bipolar DC link, this is an inexpensive way to keep both load terminals at the lowest possible voltage with respect to ground. In addition, there is no ground connection required at the midpoint of the load. Further, if a ground fault occurs on either side of the DC link, the load voltage remains close to ground, which can reduce the required insulation rating of the load.

A two quadrant DC-to-DC converter is able to source and sink power including adjust voltage and current such that (i) the voltage is positive and current is positive, or (ii) the voltage is positive and the current is negative (referred to as the two quadrants i-ii).

With a two-quadrant DC-to-DC converter and the load replaced by an energy source, the ESM, power can flow to and from a DC link capacitor to the ESM. This is possible because current can flow towards an ESM (sinking current) or towards a DC link from an ESM (sourcing current). A two-quadrant DC-to-DC converter is also able to be controlled to set ESM voltage and current levels to any arbitrary voltage and current level within predetermined ranges. The DC link and battery voltages, however, may always be positive. The current levels can be positive or negative. For example, the ESM voltage may be between the DC link rail voltages of −1300 V and 1300V, when the DC link voltage is 2600 V.

A DC-DC converter that is capable of buck and boost operation in two quadrants facilitates the connection between a main DC link, such as found in EV drive systems, and an ESM, such as a battery or fuel cell. By having a virtual ground, the connection to the ESM also has a virtual ground connection with respect to the corresponding vehicle chassis. The voltage of the ESM with respect to the vehicle chassis is able to be established at any level between the positive and negative DC link rails. This allows for a reduction in the insulation requirements of the ESM, which are normally associated with low voltage applications, while allowing the DC-to-DC converter to be used in a high-voltage application. The DC-to-DC converter with virtual ground minimizes the risk and consequential damage associated with ground faults that might occur in the DC link and/or other high-voltage portions of the corresponding drive system.

The disclosed DC-to-DC converters allow low-voltage ESMs, which were traditionally used for low-voltage automotive EVs, to be used in high-voltage and high-power applications. The DC-to-DC converters may be connected to groups of low-voltage ESMs and, in vehicle applications, allow the vehicles to be driven continuously at reduced voltage in the presence of a ground fault without damage to the ESMs. The coupling of the DC-to-DC converters with one or more ESMs constitutes a reliable and cost-effective reversible energy storage system (ESS).

In an embodiment, a DC-to-DC converter is provided that is implemented as a 2-level H-bridge converter without a hard ground connection between a corresponding ESM and the vehicle chassis. The DC-to-DC converter and control thereof maintains ESM operation near a chassis/ground potential. As such, widely available low-voltage ESMs can be used on drive systems with much higher voltage ratings and operate within voltage limits of ESM insulation. The ESM-to-chassis ground voltage is able to be maintained within insulation voltage ratings of an ESM during ground fault events on the main DC link. The DC-to-DC converters are able to be used on systems with symmetric or unsymmetric DC links. During fault events, the ESM-to-chassis ground voltage may rise, but remains within safe predetermined limits. In one embodiment, after a ground fault event occurs, the drive system is able to be continuously operated with the ground fault present at a reduced DC link voltage level.

The disclosed examples also include conversion circuit configurations and control to implement interleaved and staggered modes of operation. The interleaved and staggered modes of operation reduce ripple current on DC links and in loads or ESMs. Ripple current may be reduced by using interleaved and/or staggered control of phase legs of DC-to-DC converter circuits, as further described below.

The disclosed power supply systems allow widely available, low-voltage automotive ESMs (e.g., low-voltage batteries configured to power automotive EVs) to be directly utilized in large vehicle applications, such as in mining and construction vehicle drive systems. The large vehicle applications require significantly more power than small vehicle applications and operate at voltage levels that can exceed the insulation voltage ratings of low-voltage ESMs. The ability to incorporate existing low-voltage ESM technology into high-voltage products represents a significant cost reduction and greatly reduces time-to-market for large zero emission vehicles.

The examples disclosed herein are applicable to energy storage systems (ESSs) including a main DC link that operates at a voltage, which exceeds insulation voltage ratings of associated ESMs. The examples are applicable to EVs of all sizes and voltage and power ratings, wayside power systems for rail and trolley vehicles, and other vehicle applications. The examples are also applicable to (i) applications having different power sources than batteries and fuel cells, and (ii) non-vehicle applications, where power is supplied to loads and regenerative capable loads other than propulsion motors. The disclosed examples are applicable to: microgrid power systems; industrial drives; wayside energy storage systems for rapid transit; trolley systems; industrial drive systems requiring ride-through capability or peak shaving capabilities; and solar photovoltaic (PV) installation applications. In a solar PV installation, the power source may include multiple photovoltaic cells. The loads may include fans, storage drives, etc.

FIG. 1 shows an example power supply system 100 including multiple power sources 102, 104, 106, a conversion circuit 107 including multiple 2-level buck-boost DC-to-DC converters 108, 110 (referred to as the DC-to-DC converters 108, 110), and multiple inverters 112 connected to respective loads 114 which may be regenerative capable. The power sources 102, 104, 106 are example power sources and may be replaced with other power sources. In the example shown, the power source 102 is implemented as an engine, the power source 104 is implemented as a trolley pantograph, and the power source 106 is implemented as a group (or groups) of ESMs. The power source 102 is connected to an alternator 120, which supplies AC power to a rectifier 122. A field regulator 124 regulates voltage out of the alternator 120. The rectifier 122 outputs a DC voltage on a DC link 126 having DC rails 126A, 126B. The rectifier 122 is an AC-to-DC rectifier. The DC link 126 may be referred to as a DC bus having bus bars. The DC rails 126A, 1268 may each be positive or negative, such that there is one positive rail and one negative rail, two positive rails or two negative rails.

The pantograph 104 receives DC power from overhead lines and supplies the DC power to a line reactor 130 and a trolley box 132. The line reactor 130 prevents interference between DC link voltages (or capacitor voltages on the DC link 126) of the power supply system 100 and DC link voltages of other power supply systems connected to the overhead lines. The power supply system 100 may be implemented for a host vehicle and the other power supply systems may be implemented within other respective vehicles. The trolley box 132 allows the pantograph 104 to remain in contact with trolley lines and connect or disconnect the DC link 126 from the trolley lines in a safe quick manner. The trolley box 132 may include various circuit components, such as one or more fuses, circuit breakers, sensors (e.g., voltage and current sensors), switches, etc. The sensors may be used to assure that the trolley line voltage is within a predetermined range prior to connecting the DC link 126 to the trolley lines to prevent a surge of current to/from the trolley lines from/to the DC link 126. The switches of the trolley box 132 may be used for connecting the DC link 126 to and disconnecting the DC link 126 from the pantograph 104 and thus the overhead lines.

The group of ESMs 106 may include multiple sub-groups of ESMs. For example, each sub-group of ESMs may be connected to one or more of the DC-to-DC converters 108, 110. In the example shown, a first sub-group 134 of ESMs is connected to the first DC-to-DC converter 108 and include ESMs 135. A second sub-group 136 of ESMs is connected to both of the DC-to-DC converters 108, 110 and include ESMs 137. A third sub-group 138 of ESMs is connected to the second DC-to-DC converter 110 and include ESMs 139. The group of ESMs (or power source) 106, when discharging, source power to the DC link 126. The group of ESMs 106, when charging, may sink power received from (i) one or more of the power sources 102, 104, and/or (ii) one or more of the regenerative capable loads 114 via the corresponding ones of the inverters 112. The ESMs 135, 137, 139 and other ESMs disclosed herein may each include battery cells, fuel cells, switches, resistors, control circuits, etc. The ESMs 135, 137, 139 and other ESMs disclosed herein may instead of or in addition to battery cells or fuel cells, include pumps, light sources, heaters, and/or other DC loads and/or sources. The loads 114 may include motors, DC-to-DC choppers, auxiliary loads (e.g., fans), etc. Some of the loads 114 may be able to source power, such as motors operating in the second or fourth quadrant.

The conversion circuit 107 further includes reactor sets 140, 141, which are connected between the DC-to-DC converter 108 and the power source 106. Reactor sets 142, 143 are connected between the DC-to-DC converters 108, 110 and the power source 106. Reactor sets 144, 145 are connected between the DC-to-DC converter 110 and the power source 106. The reactor sets 140-145 may each be implemented as a respective set of one or more reactors (or inductors). Each reactor (or inductor) in each of the reactor sets 140-145 is connected to a respective phase of a corresponding one of the DC-to-DC converters 108, 110. First terminals of the reactors in each of the reactor sets 140-145 is connected to a respective phase of a corresponding one of the DC-to-DC converters 108, 110 via respective lines (e.g., lines X, where X is an integer greater than or equal to 1). Second terminals of the reactors in each of the reactor sets 140-145 are connected together and to, for example, the same contactor, disconnector or ESM group, depending on whether a contactor and/or a disconnector are connected between that reactor set and the corresponding ESM group. The inclusion of multiple reactors in the reactor sets 140-145 and corresponding phase legs allows for interleaved operation, as further described below. Interleaved operation may be provided for reactor sets of one or more of ESM groups.

A first set of contactors 146 and a first set of disconnectors 148 may be connected between the reactors 140, 142, 144 and the power source 106. A second set of disconnectors 150 and a second set of contactors 152 may be connected between the power source 106 and the reactors 141, 143, 145.

The contactors 146, 152 may be electrically powered contactors and activated and deactivated by a control module 160 to connect the sub-groups 134, 136, 138 to and disconnect the sub-groups 134, 136, 138 from the DC link 126. The disconnectors 148, 150 are manual switches, which may be switched by personal for safety reasons to isolate the sub-groups 134, 136, 138 from the DC link 126.

Although three power sources 102, 104, 106 are shown as providing power to and/or being connected to the DC link 126, any number of power sources may provide power to and/or be connected to the DC link 126.

The DC-to-DC converters 108, 110 are two-way converters, such that during operation the DC-to-DC converters 108, 110 convert DC voltage across the sub-groups of ESMs 134, 136, 138 to a DC voltage on the DC link 126 and vice versa. The DC-to-DC converters may be replaced by, connected similarly and/or configured similarly as any of the DC-to-DC converters disclosed herein. The conversion circuit 100, in conjunction with the DC-to-DC converters 108, 110 and the reactor sets 140-145 has virtual grounds.

Figure 2:
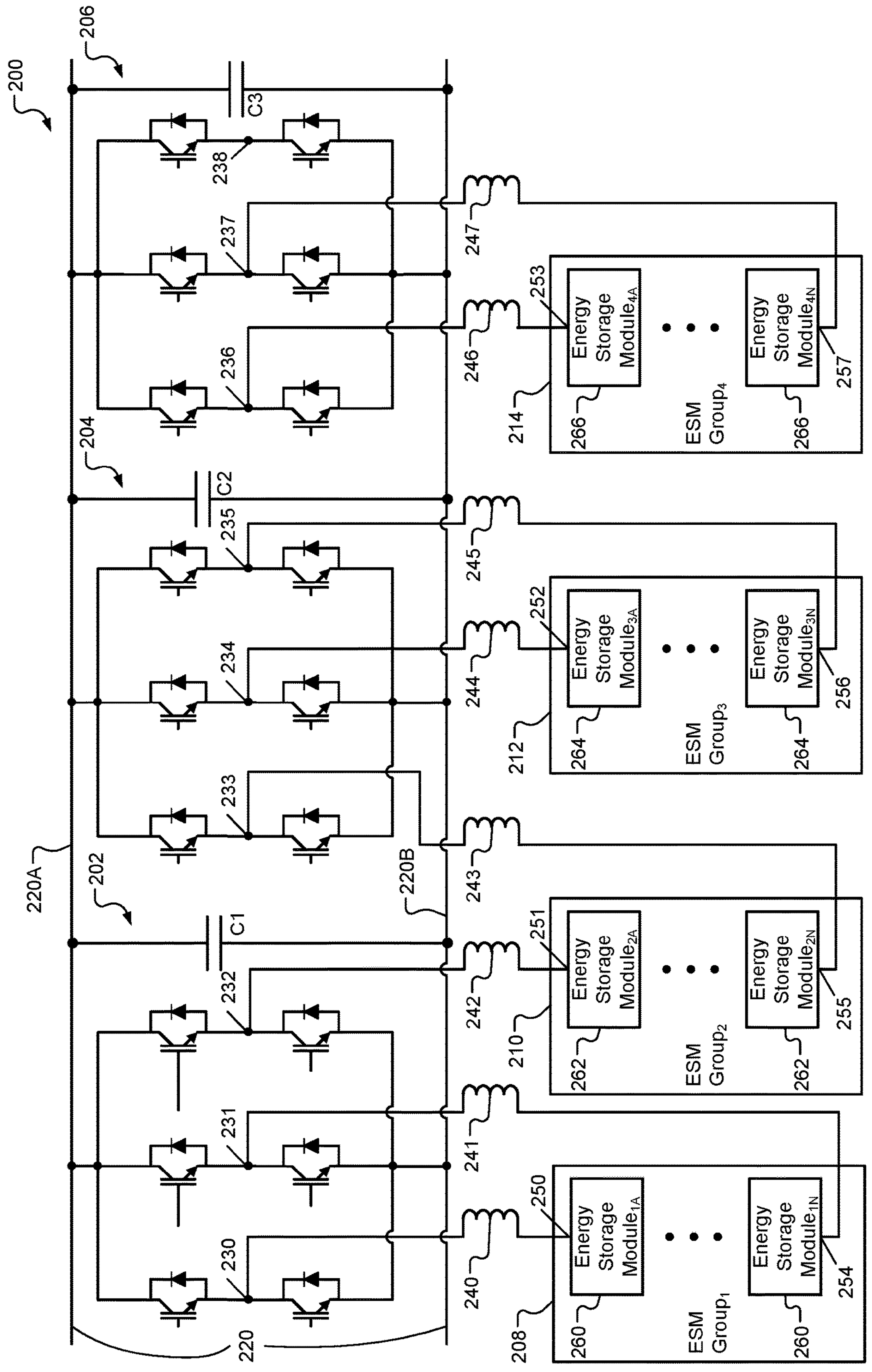
FIG. 2 is a functional block and schematic diagram of an example conversion circuit including for example 2-level buck-boost DC-to-DC converters and four energy storage module groups in accordance with an embodiment of the present disclosure.
Figure 3:
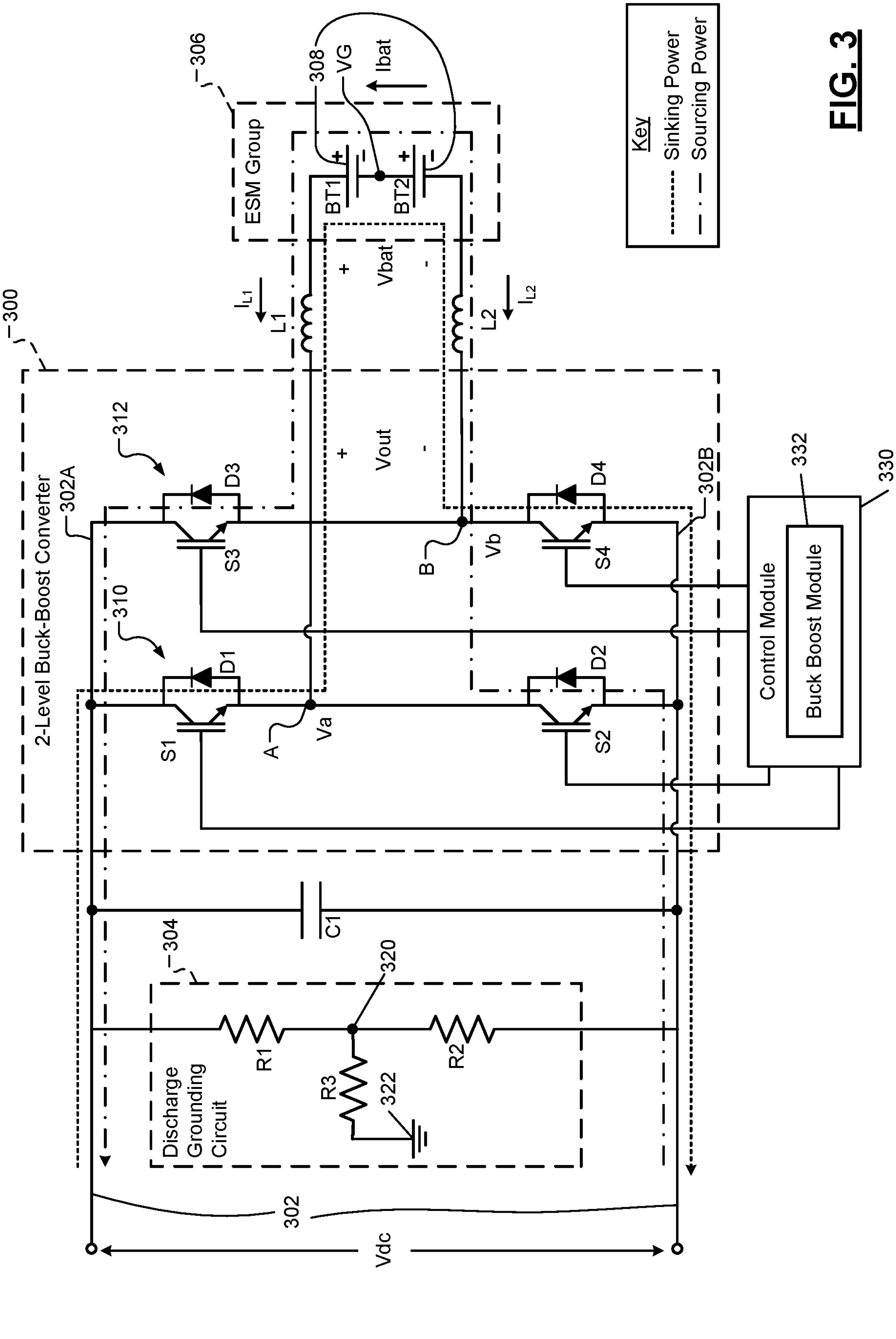
FIG. 3 is a schematic diagram of an example 2-level buck-boost DC-to-DC converter with virtual ground in accordance with the present disclosure.

The power supply system 100 may include various sensors 162, such as current sensors, voltage sensors, temperature sensors, etc. As an example, current and voltage sensors may be used to detect: current through and voltages in the trolley box 132; current and voltages of the DC link 126; current and voltages of each of the ESMs 135, 137, 139; levels of current flowing to and from the reactors 140-145; etc. The control module 160 may control operation of the power sources 102, states of switches in the trolley box 132, states of switches of the DC-to-DC converters 108, 110, states of the contactors 146, 152, etc. based on outputs of the sensors 162. Examples of the switches within DC-to-DC converters are shown in FIGS. 2-3. The control module 160 may control the switches within the trolley box 132 based on outputs of sensors in the trolley box 132 to connect the DC link 126 to and/or disconnect the DC link 126 from the pantograph 104 and thus the overhead lines. The control module 160 may control states, switching frequencies, and/or duty cycles of switches of the DC-to-DC converters to set voltages across the sub-groups 134, 136, 138. By controlling ON times of the switches S1-S4, average output voltage of each phase leg can be adjusted to any voltage within a predetermined range (e.g., 0-800V). This is further described below.

A discharge grounding circuit 170 may be connected across the rails 126A, 126B. An example of the discharge grounding circuit is shown in FIG. 3 and may include discharge resistors for passively discharging the DC link 126 when power is turned off. The discharge grounding circuit 170 may be configured such that the mid-voltage of the DC link 126 is floating above, centered on, or floating below chassis ground.

FIG. 2 shows a conversion circuit 200 including example 2-level buck-boost DC-to-DC converters 202, 204, 206 and four ESM groups 208, 210, 212, 214. Each of the DC-to-DC converters 202, 204, 206 includes three phase legs, where each phase leg includes two switch-diode pairs connected in series across a DC link 220 and having DC rails 220A, 220B. The conversion circuit 200 and the DC-to-DC converters 202, 204, 206 may replace the conversion circuit and DC-to-DC converters of FIG. 1 and may be controlled by the control module 160 of FIG. 1. The conversion circuit 200 may include contactors and disconnectors similar to those included in FIG. 1.

Center terminals 230-237 of the phase legs including corresponding ones of the switch-diode pairs are connected to respective reactors (or inductors) 240-247. The last center terminal 238 of the last phase leg of the DC-to-DC converter 206 is not connected to a reactor. The reactors 240-247 are connected to the ESM groups 208, 210, 212, 214. The reactors 240, 242, 244, 246 are connected to first terminals 250-253 (input or output terminals) and the reactors 241, 243, 245, 247 are connected to second terminals 254-257 (input or output terminals) of the ESM groups 208, 210, 212, 214. The first terminals 250-253 and the second terminals 254-257 may be input or output terminals depending on whether the DC-to-DC converters 202, 204, 206 are sourcing or sinking power.

Each of the ESM groups 208, 210, 212, 214 may include any number of ESMs (e.g., ESMs 260, 262, 264, 266). The ESMs may be referred to as power sources. Each of the ESMs may include battery cells, groups of battery cells, one or more batteries, one or more battery packs, and/or other power sources. The ESMs may be connected in series and/or in parallel.

The DC-to-DC converters 202, 204, 206 have three respective DC-to-DC sub-conversion circuits including the reactors 240-241 and 244-247. The DC-to-DC converters 202, 204 have phase legs that are connected to the same ESM group 210 and in so doing provide a fourth DC-to-DC sub-conversion circuit having reactors 242-243. The third phase leg of the DC-to-DC converter 202 is connected to the ESM group 210 and the first phase leg of the DC-to-DC converter 204 is connected to the ESM group 210. The virtual grounds respectively of the DC-to-DC converters of FIG. 2 may be at the same or different voltage potentials.

FIG. 3 shows a 2-level buck-boost DC-to-DC converter 300 with a virtual ground VG. The DC-to-DC converter 300 may replace any of the DC-to-DC converters disclosed herein and is connected across a DC link 302 having DC rails 302A, 302B. A discharge grounding circuit 304 may be connected to the DC link 302. The DC-to-DC converter 300 is connected to an ESM group 306 including ESMs 308, which are shown as batteries, but may be implemented as other power sources.

The DC-to-DC converter 300 may include two or more phase legs (two phase legs 310, 312 are shown). Each of the phase legs includes two switch-diode pairs. The phase leg 310 includes switches S1, S2 and diodes D1, D2 and the phase leg 312 includes switches S2, S4 and diodes D3, D4. The switches S1-S4 are connected in an anti-parallel arrangement respectively with the diodes D1-D4. The switch-diode pairs S1, D1 and S2, D2 are connected in series between the rails 302A, 302B. The switch-diode pairs S3, D3 and S4, D4 are connected in series between the rails 302A, 302B. Terminals A, B between the switch-diode pairs are connected to inductors L1, L2, respectively. The inductors L1, L2 are connected to the ESMs 308.

When the ESMs 308 and/or ESM group 306 sink power, current may flow clockwise through the switch S1 to the inductor L1, through the ESMs 308 and then through the inductor L2 and the switch S4. When S1 and S4 are ON (or closed), the voltage at terminal A is greater than the voltage at terminal B and current increases through the inductor L1, the ESM group 306 and the inductor L2. When the switches S1 and S4 turn OFF (or open), clockwise (CW) current freewheels through the diodes D2 and D3 and the voltage at terminal A is less than the voltage at terminal B and the CW current decreases.

When the ESMs 308 and/or ESM group 306 source power, current flows counterclockwise (CCW) through the switch S2, the inductor L2, through the ESMs 308 and through the inductor L1 and the switch S3. When the switches S2 and S3 are ON (or closed), the voltage at terminal A is less than the voltage at terminal B and CCW current increases through the inductor L2, the ESM group 306, and the inductor L2. When the switches S2 and S3 turn OFF (or open) CCW current freewheels through the diodes D1 and D4 and the voltage at terminal A is greater than the voltage at terminal B and the CCW current flows through the inductor L2, the ESM group 306, and the inductor L1 decreases. The switches S1-S4 and other switches referred to herein may be implemented as insulated-gate bipolar transistors (IGBTs) and/or as other types of switches. The diodes D1-D4 may be implemented as anti-parallel freewheeling diodes.

The DC-to-DC converter 300 supports bi-directional current flow and, while sinking power, converts a first DC voltage Vdc across the DC link rails 302A, 302B to a second DC voltage provided to the ESM group 306. While sourcing power, the DC-to-DC converter 300 converts the voltage at the ESM group 306 to the voltage Vdc across the DC link rails 302A, 302B.

The discharge grounding circuit 304 may include a voltage divider including resistors R1, R2 connected in series across the DC link rails 302A, 302B. A resistor R3 is connected to a terminal 320 between the resistors R1, R2 and to a ground reference terminal 322. A capacitor C1 may be connected across the rails 302A, 302B.

A control module 330, which may be configured similarly as and/or operate similarly as the control module 160 of FIG. 1, controls states of the switches S1-S4. This may be based on various sensors, such as at least some of the sensors 162 of FIG. 1.

The phase legs 310, 312 form an H-bridge having input/output terminals A and B having with voltages Va and Vb, respectively. A load on the DC-to-DC converter 300 includes the series connected filter inductor L1, ESM group 306 (depicted as series connected batteries with voltage Vbat), and filter inductor L2. The H-bridge is operated as a 2-level DC-to-DC converter with 2-quadrant operation (in the first and second quadrants) in buck and boost modes to facilitate bi-directional energy transfer between (i) the high-voltage main DC link 302 (having voltage Vdc) and (ii) the low-voltage load or ESM group 306. Charging and discharging is possible with ESMs of either positive or negative polarity. In one embodiment the ESM voltage Vbat is always positive. However, the ESM voltage Vbat may be negative. In this case the DC-to-DC converter 300 operates in quadrants three and four. The converter is capable of 4-quadrant operation, but the choice of quadrants is determined by the required polarity of the load or ESM group.

The voltage $V_{out}$ of the H-bridge is equal to a difference between the voltages Va, Vb, when S1 and S4 are closed or when S2 and S3 are closed and has two possible values, ±Vdc. The filter inductors L1, L2 limit and smooth a level of current Ibat to and from the ESM group 306. When the level of current Ibat is greater than 0 the ESM group 306 is charging. When the level of current Ibat is less than 0, the ESM group 306 is discharging. At all times, levels of current through the inductors L1, L2 is equal to the level of current Ibat. When R1=R2 and L1=L2, a mid-ESM group voltage Vbat-mid may be at a chassis ground potential GND. The mid-ESM group voltage Vbat-mid refers to a sum of Vbat+ and Vbat− divided by two, which is the potential at the virtual ground point (or terminal) VG.

The mid-ESM group voltage Vbat-mid, with respect to a chassis voltage may be controlled by setting values of the inductors L1, L2 to set the ratio L1/L2. This allows for symmetric or non-symmetric values for +Vdc/2 and −Vdc/2. The ratio of L1/L2 may be chosen to position the mid-ESM voltage at, above or below the chassis GND potential.

The resistors R1-R3, the capacitor C1 and the inductors L1-L2 may each be variable, adjustable or constant. In one embodiment, the control module 330 adjusts the inductances of L1 and L2 while under load. As an example, the resistors R1-R3 may be each 10-100 kilo-ohms (kΩ). The value of R1 may be less than 10 kn. In an embodiment, the value of R1 is less than 1 kΩ. The control module 330 may control the values of R1-R3 and/or L1-L2 to set the virtual ground between the terminals A, B, between the inductors L1, L2, and between the ESMs 308. The values of R1, R2 may be the same or different and/or the values of L1, L2 may be the same or different. This allows the voltage across the DC link 302 to be symmetric or non-symmetric. When symmetric, the values of R1, R2 may be the same and the values of L1 and L2 may be the same. When non-symmetric, the values of R1, R2 may be different and/or the values of L1, L2 may be different, such that the virtual ground is offset such that the voltage potential of the virtual ground is not centered between the voltages of the DC link rails 302A, 302B and/or centered between the voltages Vbat+ and Vbat−. The control module 330 may control the states of the switches S1-S4 to further adjust the setting of the voltage potential of the virtual ground.

The control module 330 may include a buck-boost module 332 that controls buck and boost operations including timing, frequency and duty cycles of switches S1-S4. For example, the control module 330 may control states of the switches S1-S4 to control whether the DC-to-DC converter 300 is operating in a buck (or sourcing) mode or a boost (or sinking) mode. This may include controlling ON and OFF states of the switches S1-S4, the frequencies at which the switches S1-S4 are transitioned between ON and OFF states, the duty cycles of the switches S1-S4, etc.

By having halves of the inductance filtering of the DC-to-DC converter connected respectively to each of the terminals A, B, a "virtual" ground is provided. This causes the ESM group voltage Vbat to remain near a chassis ground potential without a direct ground connection. The arrangement includes 2-level phase legs while each ESM remains within safe insulation voltage limits even in the presence of ground faults in the high-voltage portion of the corresponding drive system. The ground faults correspond to a DC link rail being shorted to a ground reference (e.g., chassis ground). This may occur, for example, when a motor winding is shorted to ground, which can cause a DC link rail to jump between, for example, 0 and 2600V or between 0 and −2600V. By having the virtual ground arrangement, damage to battery (or ESM) insulation is prevented by preventing voltages across batteries (or ESMs) from exceeding insulation voltage limits. This allows for a simple control scheme and eliminates the need for expensive 3-level buck-boost converters and mid-point ground connections to DC link capacitors and batteries.

The virtual ground protects the ESMs 308 from experiencing an overvoltage level. An overvoltage level refers to a voltage level that is greater than a maximum insulation voltage level of the ESMs 308. This is further described below. Mid-points of the capacitor C1 and the ESM group 306 are not physically connected to ground. The inductors (or reactors) L1, L2 are used as positive and negative inputs and outputs of the ESM group 306.

In an embodiment, the control module 330 is configured to detect when a ground fault exists and to continue to control active operation of the switches S1-S4 to provide the DC link voltage at a reduced voltage level. The control module 330 permits the corresponding drive system and/or vehicle to operate in a "limp" mode indefinitely and/or until, for example, the vehicle is driven to a safe location and/or service location. The vehicle may continue to operate at the reduced DC link voltage level, which is provided due to the configuration of the DC-to-DC converter with floating (virtual) ground.

Figure 4:
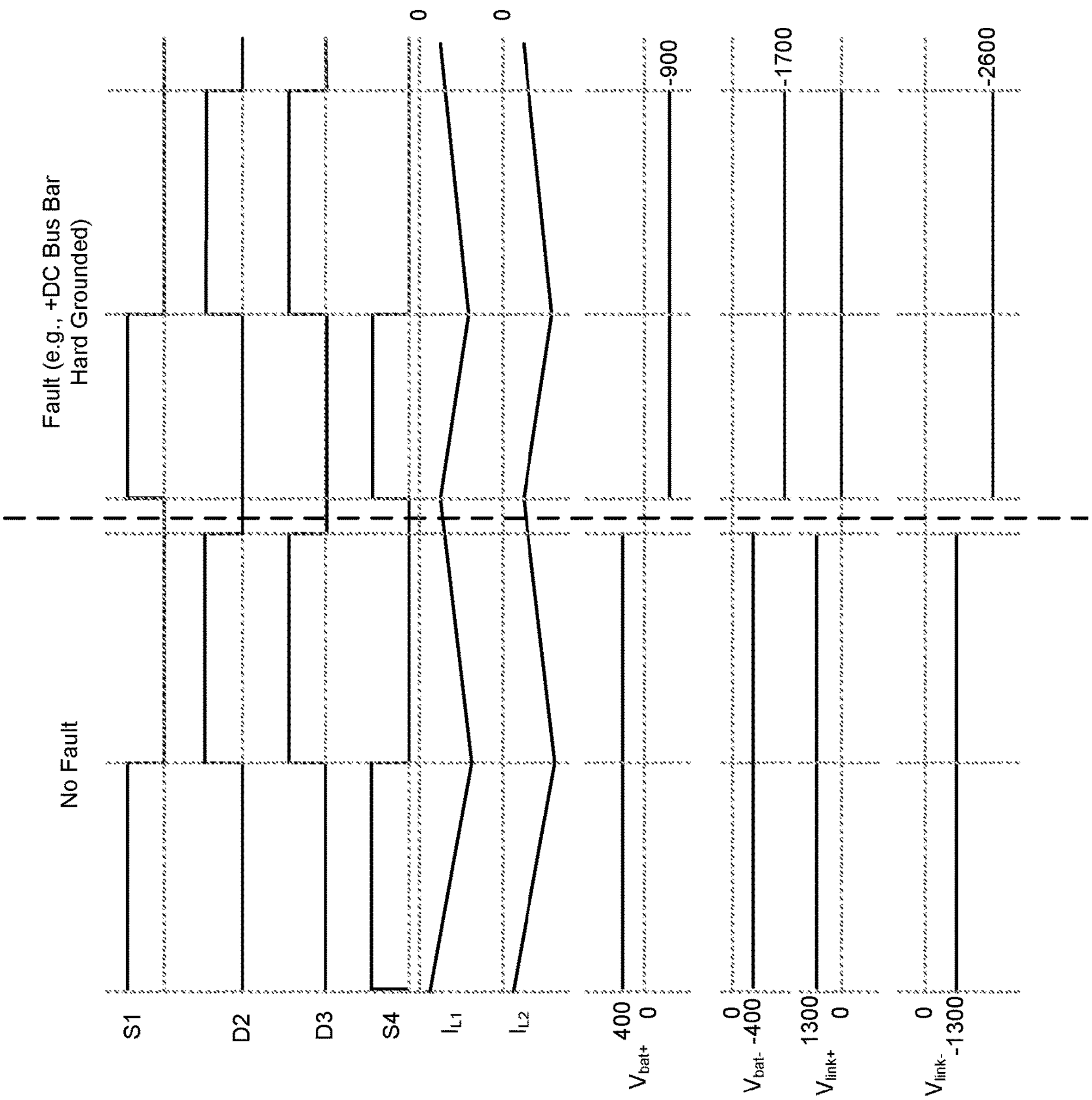
FIG. 4 is an example signal flow diagram during charging (sinking power) of states of switches and diodes of the 2-level buck-boost DC-to-DC converter of FIG. 3, reactor current levels, and battery and bus bar voltages for no fault and fault conditions.

FIG. 4 shows a signal flow diagram for charging operation of states of the switches S1, S4 and diodes D2, D3 of the DC-to-DC converter 300 of FIG. 3, inductor current levels $I_{L1}$, $I_{L2}$, battery voltages Vbat+, Vbat− and bus bar (or DC link rail) voltages Vlink+, Vlink− for no fault and fault conditions. Switches S2, S3 and diodes D1 D4 do not conduct during charging. The fault condition may be, for example, a +DC bus bar hard ground fault or other ground fault.

In the example shown, the states of S1, D2, D3, S4 and the current levels $I_{L1}$, $I_{L2}$ are the same during the normal operating condition and during the ground fault condition. During normal operation, the battery voltage Vbat+ may be +400V, the battery voltage Vbat− may be −400V, the bus bar voltage Vlink+ may be +1300V and the bus bar voltage Vlink− may be −1300V. During a ground fault condition where the positive DC bus 302A shorts to ground, the battery voltage Vbat+ may be −900V, the battery voltage Vbat− may be −1700V, the bus bar voltage Vlink+ may be 0V and the bus bar voltage Vlink− may be −2600V. As can be seen, the virtual ground prevents the voltage Vbat− from transitioning to the negative bus bar voltage Vlink− (or −2600V). This limits the voltage across each of the ESMs 308. The voltage at the negative terminal of BT2 during the ground fault may be −1700V. The voltage at the positive terminal of BT1 may be −900V. This maintains the voltages of the ESMs with respect to ground within a safety margin range for each of the ESMs.

Figure 5:
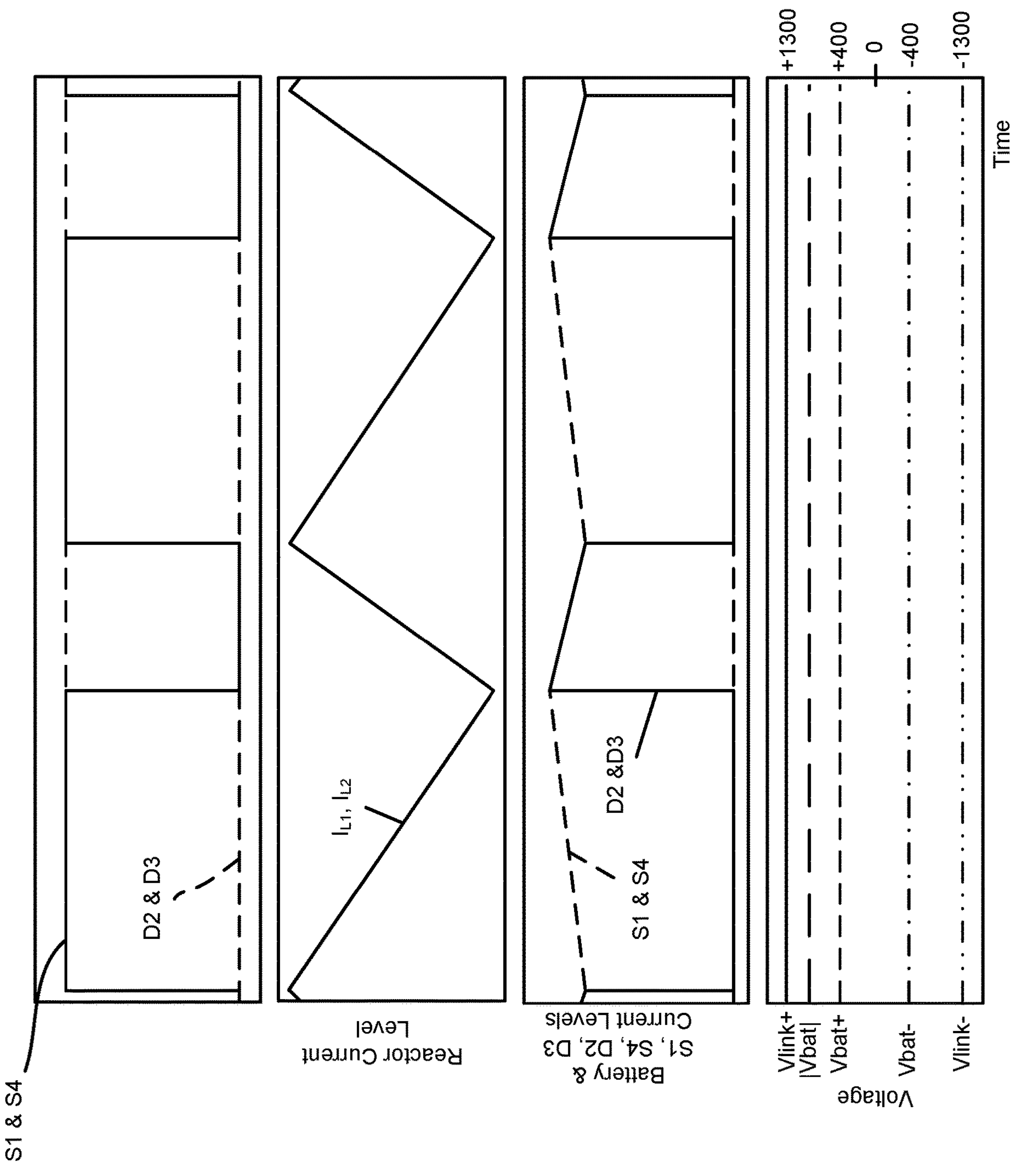
FIG. 5 is an example signal flow diagram of states of switches and diodes of the 2-level buck-boost DC-to-DC converter of FIG. 3, reactor current levels, switch current levels, and battery and bus bar voltages during charging and when no fault exists.
Figure 6:
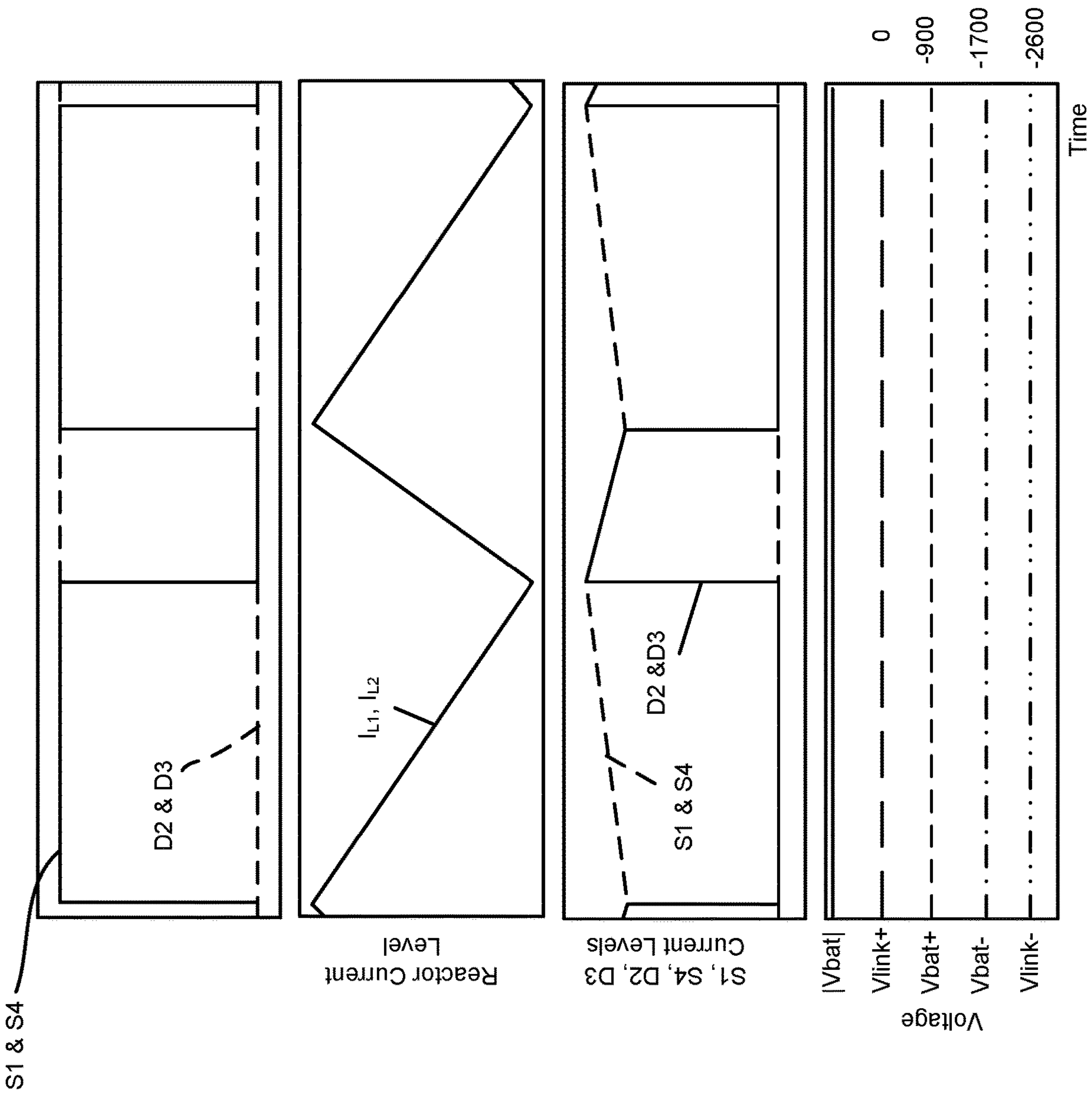
FIG. 6 is an example signal flow diagram of states of switches and diodes of the 2-level buck-boost DC-to-DC converter of FIG. 3, reactor current levels, switch current levels, and battery and bus bar voltages during charging and when a fault exists.

FIG. 5 shows a signal flow diagram of states of the switches S1, S4 and diodes D2, D3 of the DC-to-DC converter 300 of FIG. 3, the reactor current levels $I_{L1}$, $I_{L2}$, current levels of S1, D2 and S4, D3, battery voltages Vbat, Vbat+, Vbat− and bus bar voltages Vlink+, Vlink− during charging and when no fault exists. The voltages Vbat, Vbat+, Vbat−, Vlink+, Vlink− are average voltages. The voltage Vbat is equal to a difference between the voltages Vbat+, Vbat−. FIG. 6 shows a signal flow diagram of states of the switches S1, S4 and diodes D2, D3 of the DC-to-DC converter 300 of FIG. 3, reactor current levels $I_{L1}$, $I_{L2}$, current levels of S1, D2 and S4, D3, battery voltages Vbat, Vbat+, Vbat− and bus bar voltages Vlink+, Vlink− during charging and when a fault exists between DC bus 302A and ground. The voltages Vbat, Vbat+, Vbat− are within insulation voltage limits of the ESMs 308, which may be, for example, −1700V at the negative terminal of BT2. Without the virtual ground, one or more of the voltages Vbat, Vbat+, Vbat− may exceed the insulation voltage limits by as much as 500-1000V. In the example shown with the ground fault, Vbat is +800V, Vbat+ is −900V, Vbat− is −1700V, Vlink+ is 0V and Vlink− is −2600V.

Figure 7:
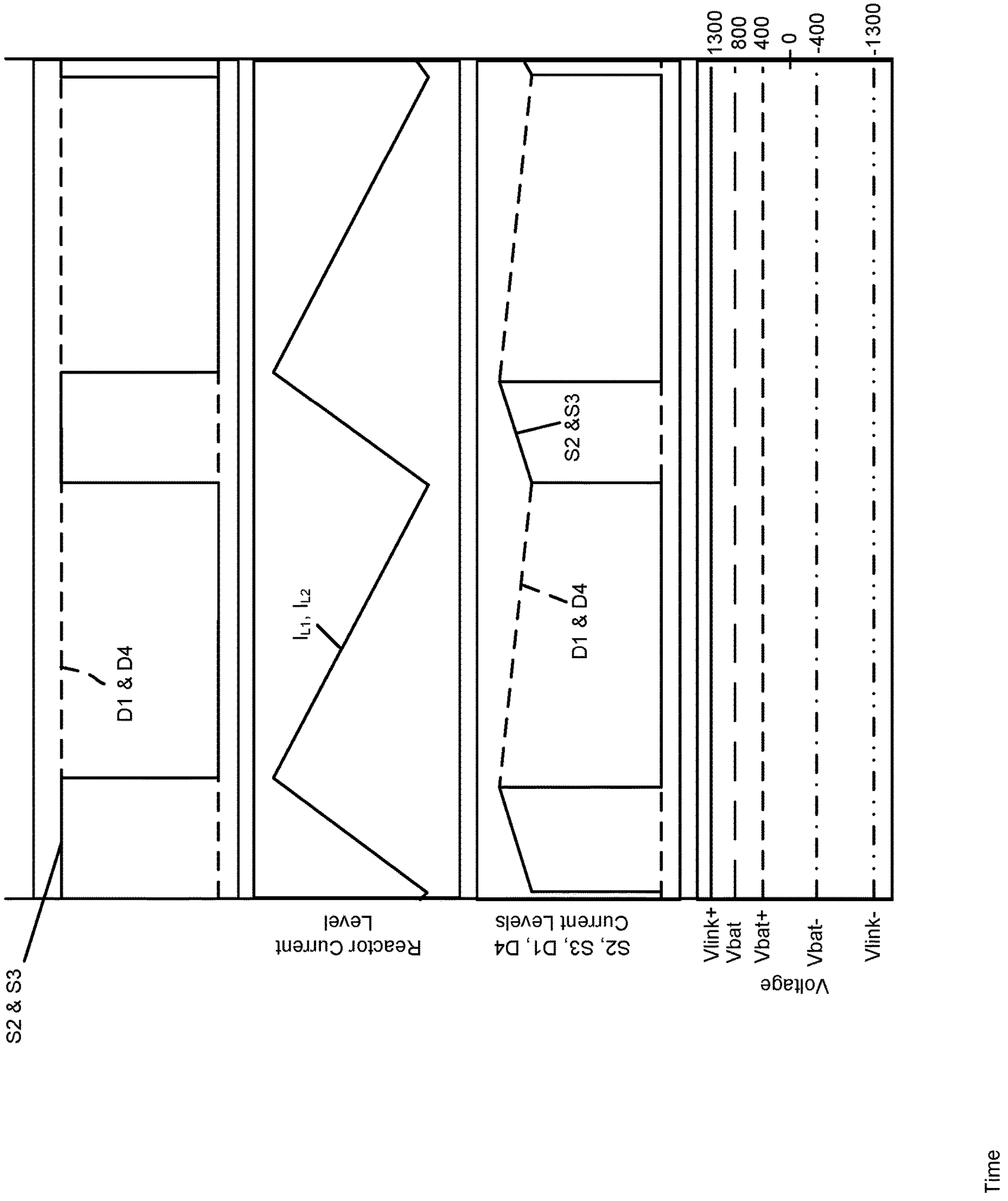
FIG. 7 is an example signal flow diagram of states of switches and diodes of the 2-level buck-boost DC-to-DC converter of FIG. 3, reactor current levels, switch current levels, and battery and bus bar voltages during discharging and when no fault exists.
Figure 8:
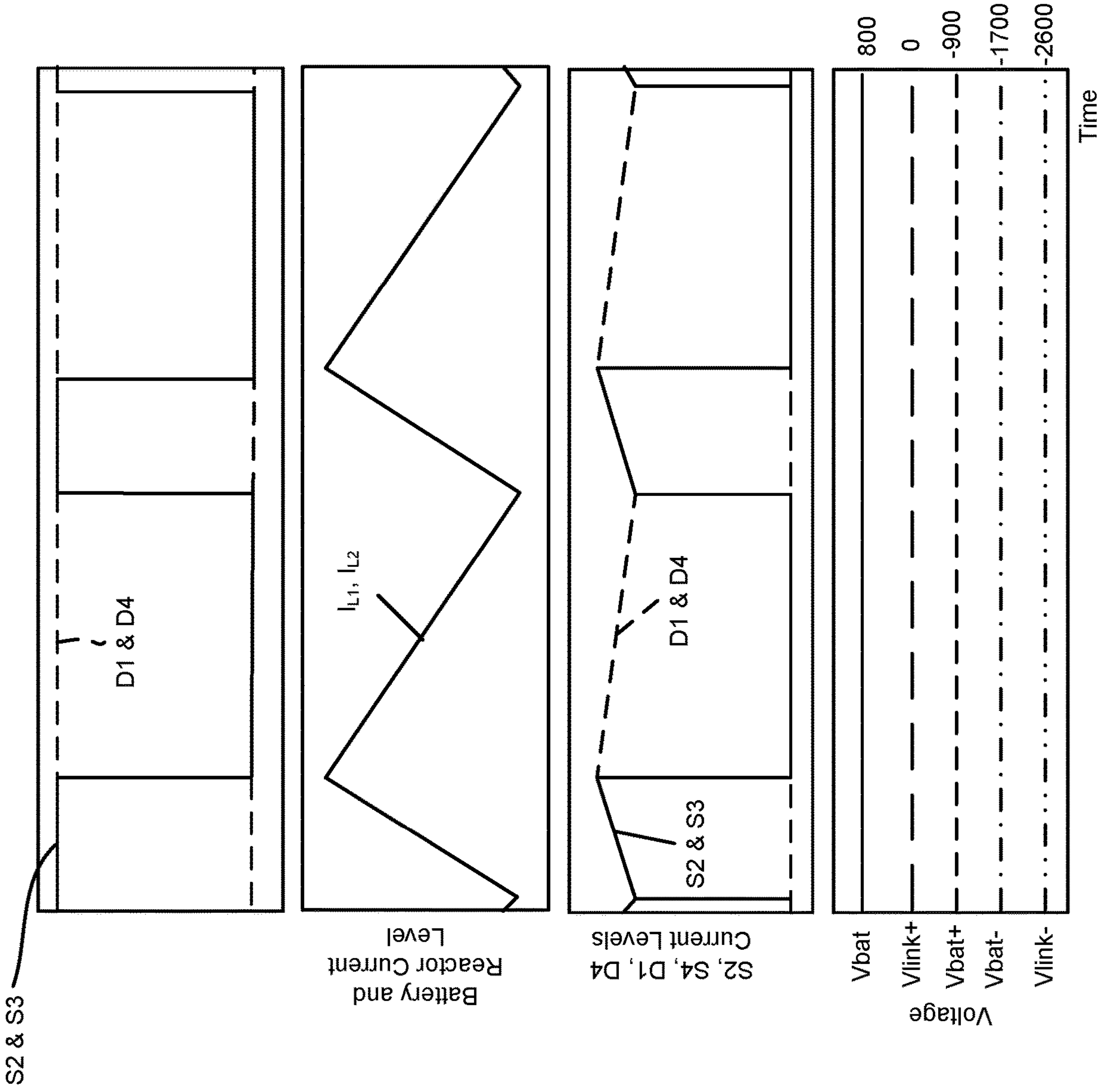
FIG. 8 is an example signal flow diagram of states of switches and diodes of the 2-level buck-boost DC-to-DC converter of FIG. 3, reactor current levels, switch current levels, and battery and bus bar voltages during discharging and when a fault exists.

FIG. 7 shows a signal flow diagram of states of the switches S2, S3 and diodes D1, D4 of the DC-to-DC converter 300 of FIG. 3, the reactor current levels $I_{L1}$, $I_{L2}$, current levels of S2, D1 and S3, D4, battery voltages Vbat, Vbat+, Vbat− and bus bar voltages Vlink+, Vlink− during discharging and when no fault exists. FIG. 8 shows a signal flow diagram of states of the switches S2, S3 and diodes D1, D4 of the DC-to-DC converter 300 of FIG. 3, reactor current levels $I_{L1}$, $I_{L2}$, current levels of S2, D1 and S3, D4, battery voltages Vbat, Vbat+, Vbat− and bus bar voltages Vlink+, Vlink− during discharging and when a fault exists. The voltages Vbat, Vbat+, Vbat− are within insulation voltage limits of the ESMs 308. Without the virtual ground, one or more of the voltages Vbat, Vbat+, Vbat− may exceed the insulation voltage limits by as much as 500-1000V. In the example shown with the ground fault, Vbat is +800V, Vbat+ is −900V, Vbat− is −1700V, Vlink+ is 0V and Vlink− is −2600V.

Although example voltages are provided above with respect to FIGS. 5-8, other voltages may occur. As some examples, the DC link (bus voltage) Vdc may be between 2200-2800V. The ESM charging voltage range for a group of ESMs may be 650-800V.

Figure 9:
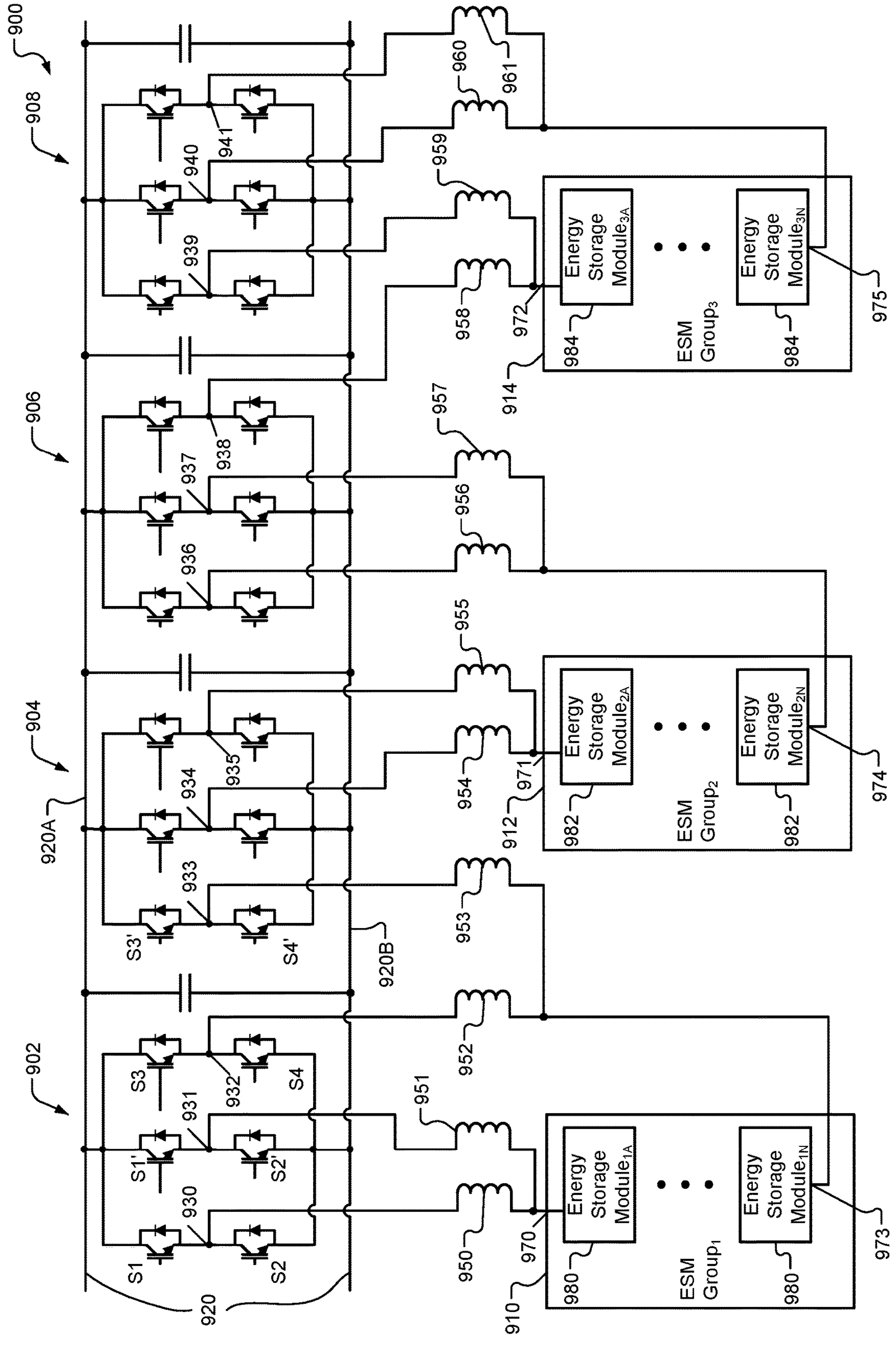
FIG. 9 is a functional block and schematic diagram of an example conversion circuit including example 2-level buck-boost DC-to-DC converters configured for interleaved and staggered operation in accordance with the present disclosure.

FIG. 9 shows an example conversion circuit 900 including example 2-level buck-boost DC-to-DC converters 902, 904, 906, 908 configured for interleaved and staggered operation. The DC-to-DC converters 902, 904, 906, 908 are connected to three ESM groups 910, 912, 914. Each of the DC-to-DC converters 902, 904, 906, 908 includes three phase legs, where each phase leg includes two switch-diode pairs connected in series across a DC link 920 and having DC rails 920A, 920B. The conversion circuit 900 and the DC-to-DC converters 902, 904, 906, 908 may replace the conversion circuit and DC-to-DC converters of FIG. 1 and may be controlled by the control module 160 of FIG. 1. The conversion circuit 900 may include contactors and disconnectors similar to those included in FIG. 1.

Center terminals 930-941 of respective phase legs including corresponding ones of the switch-diode pairs are connected to respective reactors (or inductors) 950-961. The reactors 950-961 are connected to the ESM groups 910, 912, 914. The reactors 950, 951, 954, 955, 958, 959 are connected to first terminals 970-972 (input or output terminals) and the reactors 952, 953, 956, 957, 960, 961 are connected to second terminals 973-975 (input or output terminals) of the ESM groups 910, 912, 914. The first terminals 970-972 and the second terminals 973-975 may be input or output terminals depending on whether the DC-to-DC converters 902, 904, 906, 908 are sourcing or sinking power. When the first terminals 970-972 are inputs, the second terminals 973-975 are outputs. When the second terminals 973-975 are inputs, the first terminals 970-972 are outputs. The terminals 970 may be connected together. The terminals 971 may be connected together. The terminals 972 may be connected together.

Each of the ESM groups 910, 912, 914 may include any number of ESMs (e.g., ESMs 980, 982, 984). The ESMs may be referred to as power sources. Each of the ESMs may include battery cells, groups of battery cells, one or more batteries, one or more battery packs, and/or other power sources. The ESMs may be connected in series and/or in parallel.

Although the conversion circuit 900 includes four DC-to-DC converters 902, 904, 906, 908, the conversion circuit has three DC-to-DC sub-conversion circuits (or three DC-to-DC converter circuits), one for each of the ESM groups 910, 912, 914. This is due to the sharing of phase legs of the DC-to-DC converters 902, 904, 906, 908. The configuration of FIG. 9 includes 4 phase legs of two DC-to-DC converters and 4 inductors for each ESM group for interleaved operation. There are 12 phase legs and 12 inductors. The virtual grounds respectively of the DC-to-DC converter circuits of FIG. 9 may be at the same or different voltage potentials depending on whether, for example, (i) the inductors 950-961 have the same or different impedances, and/or (ii) the resistances of the resistors (e.g., the resistors R1, R2 of FIG. 3) of a corresponding discharge grounding circuit are the same or different.

Each DC-to-DC sub-conversion circuit (or DC-to-DC converter circuit) disclosed herein includes switches configured similarly as the switches S1-S4 of FIG. 3. The interleaved arrangements include multiple sets of switches S1-S4. For example, switches S1-S4 and switches S1'-S4' are shown in FIG. 9 as an example to identify the two sets of switches for the DC-to-DC converter circuit associated with the ESM group 910 and the inductors 950-953.

The conversion circuit 900 is configured for interleaved operation of switches for each ESM group. This includes, during charging, offsetting in time closing and opening of the switches (e.g., switches S1 and S4) of a first reactor set from corresponding interleaved switches (e.g., switches S1' and S4') of a second reactor set. Similarly, during discharging, this also includes offsetting in time closing and opening of the switches (e.g., switches S2 and S3) of the first reactor set from corresponding interleaved switches (e.g., switches S2' and S3') of the second reactor set. This is further described below with respect to FIG. 11. The interleaved operation reduced DC link ripple current.

The conversion circuit 900 is also configured for staggered operation of the ESM groups. The conversion circuit 900 is configured to stagger switching times of the phase legs associated with the ESM groups 910, 912, 914 to operate (i.e., provide power to or receive power from) the ESM groups 910, 912, 914 in a staggered mode. As an example, the charging times of the ESM groups 910, 912, 914 may be staggered in time and the discharging times of the ESM groups 910, 912, 194 may be staggered in time. In one embodiment, the charging times of the ESM groups 910, 912, 914 are staggered 120° apart and the discharging times of the ESM groups 910, 912, 194 are staggered 120° apart to further reduce the DC link and ESM ripple currents. This is further described below with respect to FIG. 11.

Figure 10:
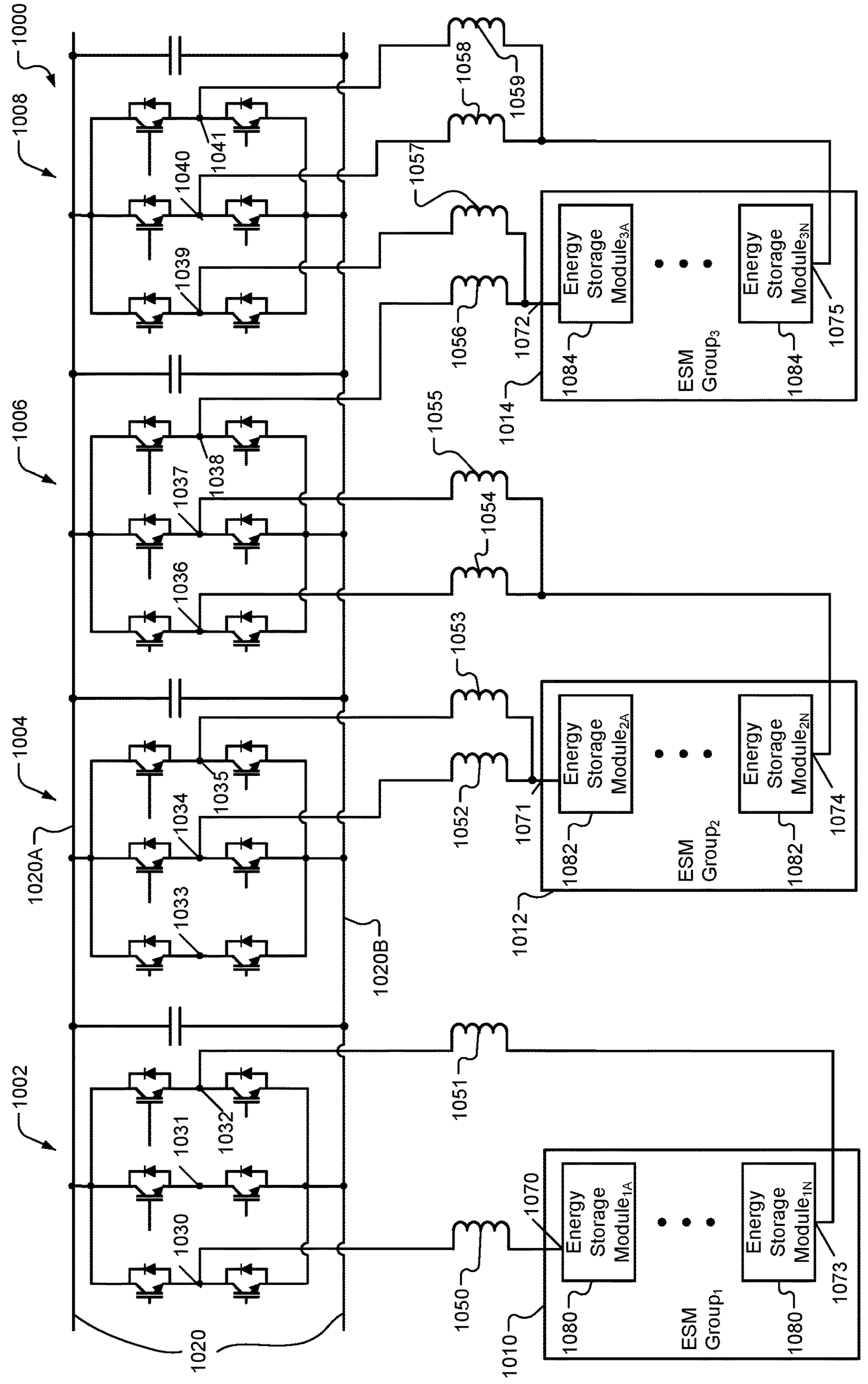
FIG. 10 is a functional block and schematic diagram of an example conversion circuit including an example non-interleaved 2-level buck-boost DC-to-DC converter and interleaved 2-level buck-boost DC-to-DC converters configured for staggered operation in accordance with the present disclosure.

FIG. 10 shows an example conversion circuit 1000 including an example non-interleaved 2-level buck-boost DC-to-DC converter 1002 and 2-level buck-boost DC-to-DC converters 1004, 1006, 1008 configured for interleaved operation. The DC-to-DC converters 1004, 1006, 1008 are connected to two ESM groups 1012, 1014. The DC-to-DC converter circuits associated with the two ESM groups 1012, 1014 may be operated in a staggered mode.

Each of the DC-to-DC converters 1002, 1004, 1006, 1008 includes three phase legs, where each phase leg includes two switch-diode pairs connected in series across a DC link 1020 and having DC rails 1020A, 1020B. The conversion circuit 1000 and the DC-to-DC converters 1002, 1004, 1006, 1008 may replace the conversion circuit 100 and the DC-to-DC converters of FIG. 1 and may be controlled by the control module 160 of FIG. 1. The conversion circuit 1000 may include contactors and disconnectors similar to those included in FIG. 1.

Center terminals 1030-1041 of respective phase legs are provided. The center terminals 1030, 1032, and 1034-1041 connected between corresponding ones of the switch-diode pairs are connected to respective reactors (or inductors) 1050-1059. The center terminals 1031 and 1033 are not connected to reactors. The reactors 1050-1059 are connected to the ESM groups 1010, 1012, 1014. The reactors 1050, 1052, 1053, 1056, 1057 are connected to first terminals 1070-1072 (input or output terminals) and the reactors 1051, 1054, 1055, 1058, 1059 are connected to second terminals 1073-1075 (input or output terminals) of the ESM groups 1010, 1012, 1014. The first terminals 1070-1072 and the second terminals 1073-1075 may be input or output terminals depending on whether the DC-to-DC converters 1002, 1004, 1006, 1008 are sourcing or sinking power. When the first terminals 1070-1072 are inputs, the second terminals 1073-1075 are outputs. When the second terminals 1073-1075 are inputs, the first terminals 1070-1072 are outputs.

Each of the ESM groups 1010, 1012, 1014 may include any number of ESMs (e.g., ESMs 1080, 1082, 1084). The ESMs may be referred to as power sources. Each of the ESMs may include battery cells, groups of battery cells, one or more batteries, one or more battery packs, and/or other power sources. The ESMs may be connected in series and/or in parallel.

The DC-to-DC converter 1002 is a 2-level buck-boost converter with virtual ground. The DC-to-DC converter 1002 includes 2 phase legs and 2 inductors connected to provide buck-boost conversion for the ESM group 1010. The DC-to-DC converters 1004, 1006, 1008 are 2-level buck-boost converters with virtual ground and are configured for interleaved operation. This embodiment results in less ripple current on the DC link 1020 and the ESM groups 1082, 1084. This includes 4 phase legs of two DC-to-DC converters and 4 inductors connected as shown to provide buck-boost conversion operation, which may be for one or more ESM groups.

Although the conversion circuit 1000 includes four DC-to-DC converters 1002, 1004, 1006, 1008, the conversion circuit has three DC-to-DC sub-conversion circuits (or three DC-to-DC converter circuits), one for each of the ESM groups 1010, 1012, 1014. This is due to the sharing of phase legs of the DC-to-DC converters 1004, 1006, 1008 and the connection of three ESM groups. The virtual grounds respectively of the DC-to-DC converter circuits of FIG. 10 may be at the same or different voltage potentials.

Although the first and third phase legs of the DC-to-DC converter 1002 are used, any two phase legs of the DC-to-DC converter 1002 may be used. Although the second and third phase legs of the DC-to-DC converter 1004 are used, any two of the phase legs of the DC-to-DC converter 1004 may be used.

Figure 11:
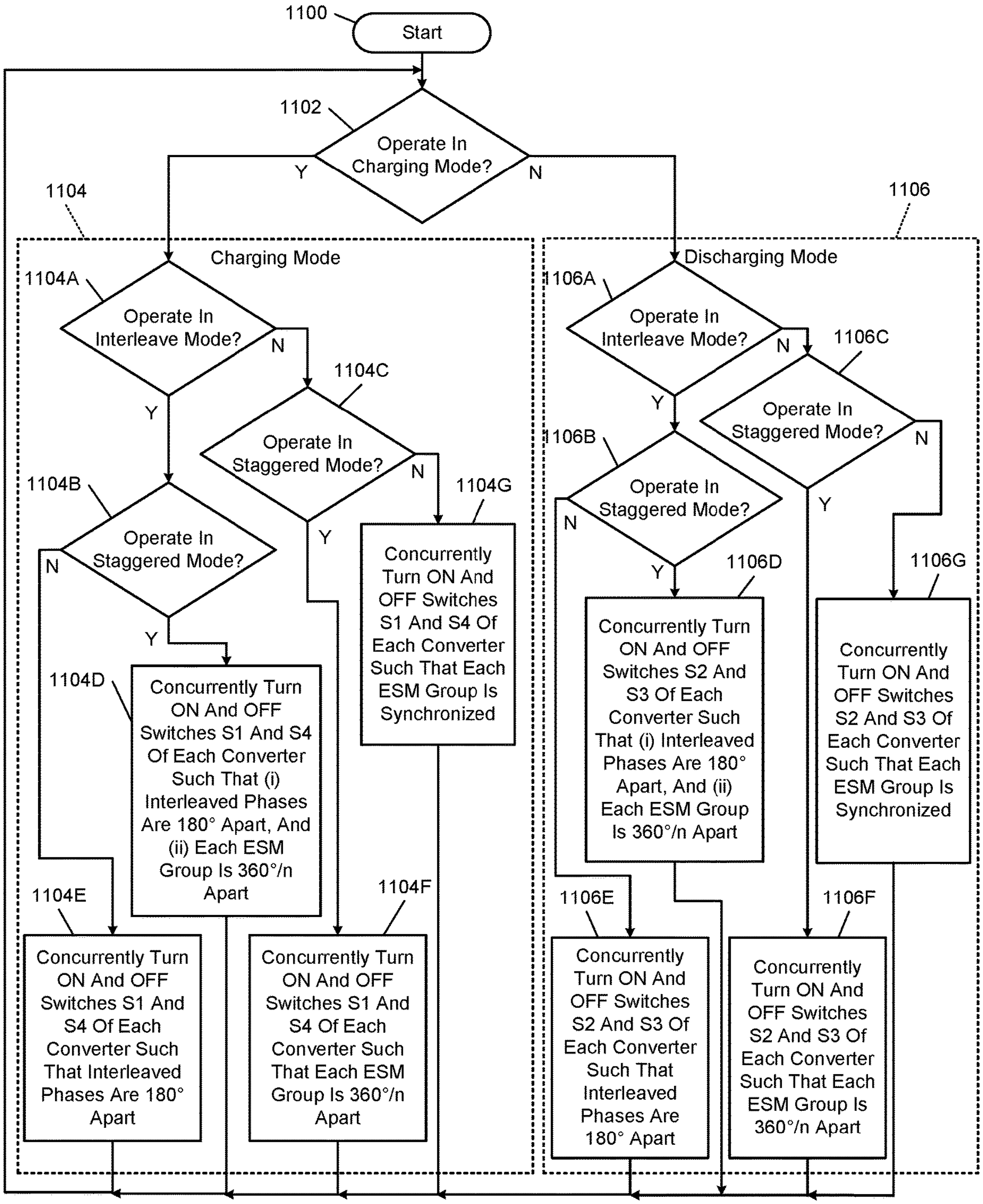
FIG. 11 illustrates a method of selectively providing non-interleaved or interleaved control and/or selectively providing non-staggered or staggered control in accordance with the present disclosure.

FIG. 11 shows a method of selectively providing non-interleaved or interleaved control and/or selectively providing non-staggered or staggered control. The operations of FIG. 11 may be iteratively performed. The operations may be performed by, for example, the control module 160 and/or 330 of FIGS. 1 and 3 and implemented on any of the conversion circuits disclosed herein.

The method may begin at 1100. At 1102, the control module determines whether to operate in a charging mode. If the charging mode is selected, operation 1104 is performed, otherwise operation 1106 is performed and the control module operates in a discharging mode.

At 1104A, the control module, while in the charging mode, determines whether to operate in an interleave mode. If yes, operation 11048 may be performed, otherwise operation 1104C may be performed.

At 1104B, the control module determines whether to operate in a staggered mode. If yes, operation 1104D is performed, otherwise operation 1104E is performed. At 1104D, the control module operates in both interleaved and staggered modes. The control module concurrently turns ON and OFF switches S1, S4 and corresponding interleaved switches (e.g., S1' and S4') of each DC-to-DC converter circuit such that (i) interleaved phases are 180° apart, and (ii) each ESM group is charged at different times.

For interleaved operation and as an example, the switches S1 and S4 of the phases of the DC-to-DC conversion circuit of FIG. 9 associated with the inductors 950, 952 and switches S1' and S4' of the phases associated with the inductors 951, 953 may be turned ON and OFF 180° apart from each other. The switches S1 and S4 are concurrently turned ON at the same time and OFF at the same time. The switches S1' and S4' are turned ON at the same time and OFF at the same time. The switches S1 and S4 are turned ON 180° apart from when the switches S1' and S4' are turned ON. Similarly, the switches S1 and S4 are turned OFF 180° apart from when the switches S1' and S4' are turned OFF. Interleaved operation may be provided for any of the DC-to-DC sub-conversion circuits (or DC-to-DC converter circuits) disclosed herein.

For staggered operation, the ESM groups are charged at different times. For example, the ESM groups may be charged in time ±120° (360°/n, where n is the number of DC-to-DC sub-converters that are staggered) apart from each other. As an example, the switches S1 and S4 for each of the three DC-to-DC sub-conversion circuits of FIG. 9 may be turned ON ±120° (or 360°/n) apart from when the switches S1 and S4 for the other two of the DC-to-DC sub-conversion circuits is turned ON. Similarly, the switches S1 and S4 for each of the three DC-to-DC sub-conversion circuits of FIG. 9 may be turned OFF ±120° (or 360°/n) apart from when the switches S1 and S4 for the other two of the DC-to-DC sub-conversion circuits is turned OFF. Staggered operation may be provided for any of the DC-to-DC sub-conversion circuits (or DC-to-DC converter circuits) disclosed herein.

At 1104E, the control module operates in interleaved mode and does not operate in staggered mode (or non-staggered mode). The control module concurrently turns ON and OFF switches S1, S4 and corresponding interleaved switches (e.g., S1' and S4') of each DC-to-DC converter circuit such that interleaved phases are 180° apart. In one embodiment and for non-staggered operation, each of the ESM groups are charged concurrently.

At 1104F, the control module operates in non-interleaved mode and staggered mode. The control module concurrently turns ON and OFF switches S1, S4 and corresponding interleaved switches (e.g., S1' and S4') of each DC-to-DC converter circuit such that interleaved phases are 0° apart. The control module concurrently turns ON and OFF switches S1, S4 and corresponding interleaved switches (e.g., S1' and S4') of each DC-to-DC converter circuit such that the ESM groups are charged at different times (e.g., 120° or 360°/n apart).

At 1104G, the control module operates in non-interleaved mode and non-staggered mode. The control module concurrently turns ON and OFF switches S1, S4 and corresponding interleaved switches (e.g., S1' and S4') of each DC-to-DC converter circuit such that interleaved phases are 0° apart. In one embodiment and for non-staggered operation, each of the ESM groups are charged concurrently.

Operation 1102 may be performed subsequent to operations 1104D, 1104E, 1104F and 1104G.

At 1106A, the control module, while in the discharging mode, determines whether to operate in an interleave mode. If yes, operation 11068 may be performed, otherwise operation 1106C may be performed.

At 1106B, the control module determines whether to operate in a staggered mode. If yes, operation 1106D is performed, otherwise operation 1106E is performed. At 1106D, the control module operates in both interleaved and staggered modes. The control module concurrently turns ON and OFF switches S2, S3 and corresponding interleaved switches (e.g., S2' and S3') of each DC-to-DC converter circuit such that (i) interleaved phases are 180° apart, and (ii) each ESM group is discharged at different times.

For interleaved operation and as an example, the switches S2 and S3 of the phases of the DC-to-DC conversion circuit of FIG. 9 associated with the inductors 950, 952 and switches S2' and S3' of the phases associated with the inductors 951, 953 may be turned ON and OFF 180° apart from each other. The switches S2 and S3 are concurrently turned ON at the same time and OFF at the same time. The switches S2' and S3' are turned ON at the same time and OFF at the same time. The switches S2 and S4 are turned ON 180° apart from when the switches S2' and S3' are turned ON. Similarly, the switches S2 and S3 are turned OFF 180° apart from when the switches S2' and S3' are turned OFF. Interleaved operation may be provided for any of the DC-to-DC sub-conversion circuits (or DC-to-DC converter circuits) disclosed herein.

For staggered operation, the ESM groups are charged at different times. For example, the ESM groups may be charged in time ±120° (or 360°/n) apart from each other. As an example, the switches S2 and S3 for each of the three DC-to-DC sub-conversion circuits of FIG. 9 may be turned ON ±120° (or 360°/n) apart from when the switches S2 and S3 for the other two of the DC-to-DC sub-conversion circuits is turned ON. Similarly, the switches S2 and S3 for each of the three DC-to-DC sub-conversion circuits of FIG. 9 may be turned OFF ±120° apart from when the switches S2 and S3 for the other two of the DC-to-DC sub-conversion circuits is turned OFF. Staggered operation may be provided for any of the DC-to-DC sub-conversion circuits (or DC-to-DC converter circuits) disclosed herein.

At 1106E, the control module operates in interleaved mode and does not operate in staggered mode (or non-staggered mode). The control module concurrently turns ON and OFF switches S2, S3 and corresponding interleaved switches (e.g., S2' and S3') of each DC-to-DC converter circuit such that interleaved phases are 180° apart. In one embodiment and for non-staggered operation, each of the ESM groups are discharged concurrently.

At 1106F, the control module operates in non-interleaved mode and staggered mode. The control module concurrently turns ON and OFF switches S2, S3 and corresponding interleaved switches (e.g., S2' and S4') of each DC-to-DC converter circuit such that interleaved phases are 0° apart. The control module concurrently turns ON and OFF switches S2, S3 and corresponding interleaved switches (e.g., S2' and S3') of each DC-to-DC converter circuit such that the ESM groups are discharged at different times (e.g., 120° (or 360°/n) apart).

At 1106G, the control module operates in non-interleaved mode and non-staggered mode. The control module concurrently turns ON and OFF switches S2, S3 and corresponding interleaved switches (e.g., S2' and S3') of each DC-to-DC converter circuit such that interleaved phases are 0° apart. In one embodiment and for non-staggered operation, each of the ESM groups are discharged concurrently.

Operation 1102 may be performed subsequent to operations 1106D, 1106E, 1106F and 1106G.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The disclosed examples provide a low-cost, reliable solution that has less complex operation than traditional DC-to-DC converter circuits. The voltages across power sources (e.g., batteries), relative to a chassis ground potential, remains within insulation voltage limits during ground faults conditions. Operation is permitted at reduced voltages in the event of a ground fault. For example, one or more of the battery voltages Vbat+, Vbat− may be changed due to a ground fault and as a result a difference between the battery voltages Vbat+, Vbat− is changed. As an example, the voltage at terminal Vbat+ may be reduced from −400V to −900V, which reduces the difference between the battery voltages Vbat+, Vbat−. This reduces the range over which the voltages Vbat+, Vbat− vary. The voltages Vbat+, Vbat− are not fixed values, but rather oscillate between minimum and maximum voltages. The reduced range allows a vehicle to be driven indefinitely and/or to a safe location and/or service station.

In a typical drive system environment, when a ground fault occurs, the system cannot be quickly shutdown because it needs time to detect and react to the ground fault. In a traditional system, by the time the system reacts to the ground fault and shutsdown the drive system, damage to battery insulation may have occurred. The disclosed examples allow a system to continue to be operate indefinitely even when a ground fault occurs by preventing voltages across batteries and/or other power sources from exceeding insulation voltage limits.

By providing the virtual ground and/or stated operation, the life of the ESMs 308 is extended due to reduced insulation voltage stress. The disclosed arrangement facilitates use of low-voltage batteries, traditionally designed for automotive EV applications, to be used in high-voltage applications and reduces time-to-market of zero-emissions vehicles.

The example 2-level buck-boost converters with virtual ground disclosed herein are low cost, simple and reliable techniques to provide buck and boost functions while minimizing voltages of load or ESM terminals with respect to ground. The virtual ground also minimizes voltage stress to load insulation. The 2-level buck-boost converters also work well with interleaved operation and do so while maintaining a virtual load ground during normal operation and under DC link ground fault conditions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various converters, circuits, groups, ESMs, reactors, and/or other elements, these converters, circuits, groups, ESMs, reactors, and/or other elements should not be limited by these terms, unless otherwise indicated. These terms may be only used to distinguish one converter, circuit, group, ESM, reactor, and/or element from another converter, circuit, group, ESM, reactor, and/or element. Terms such as "first," "second," and other numerical terms when used herein may not imply a sequence or order unless clearly indicated by the context. Thus, a first converter, circuit, group, ESM, reactor, and/or element discussed herein could be termed a second converter, circuit, group, ESM, reactor, and/or element without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A conversion circuit comprising:

a direct current (DC) link including a plurality of DC link rails;

a first DC-to-DC converter comprising a first phase leg and a second phase leg;

a first reactor connected between a first center terminal of the first phase leg and at least one energy storage module; and a second reactor connected between a second center terminal of the second phase leg and the at least one energy storage module, wherein the first reactor, the at least one energy storage module and the second reactor are connected in series between the first center terminal and the second center terminal such that the first DC-to-DC converter has a virtual ground.

2. The conversion circuit of claim 1, wherein:

the at least one energy storage module is connected between the first reactor and the second reactor; and the virtual ground is centered between the first reactor and the second reactor.

3. The conversion circuit of claim 2, wherein:

the at least one energy storage module comprises a first energy storage module and a second energy storage module; and the virtual ground is centered between the first energy storage module and the second energy storage module.

4. The conversion circuit of claim 1, wherein:

the virtual ground is at a voltage potential between voltage potentials of the plurality of DC link rails; and the DC link rails are not connected to a ground reference terminal.

5. The conversion circuit of claim 1, wherein the virtual ground is not at a voltage potential of a chassis ground.

6. The conversion circuit of claim 1, wherein the virtual ground refers to a voltage potential between at least one of (i) voltage potentials of the plurality of DC link rails, or (ii) positive and negative voltage potentials of the at least one energy storage module.

7. The conversion circuit of claim 1, wherein:

the first reactor is connected between the first center terminal of the first phase leg and a group of energy storage modules, the group of energy storage modules comprising the at least one energy storage module;

the second reactor is connected between the second center terminal of the second phase leg and the group of energy storage modules; and the first reactor, the group of energy storage modules and the second reactor are connected in series between the first center terminal and the second center terminal.

8. The conversion circuit of claim 7, wherein:

the group of energy storage modules comprises a first energy storage module and a second energy storage module connected in series;

the virtual ground is at a voltage potential equal to a voltage potential of a connection point between the first energy storage module and the second energy storage module; and the connection point is not connected to a reference ground terminal.

9. The conversion circuit of claim 1, wherein the first phase leg comprises a first set of serially connected switch-diode pairs and the second phase leg comprises a second set of serially connected switch-diode pairs.

10. The conversion circuit of claim 1, wherein the first DC-to-DC converter is implemented as a 2-level buck-boost DC-to-DC converter.

11. The conversion circuit of claim 1, further comprising:

a second DC-to-DC converter comprising a first phase leg;

a third reactor connected between a third center terminal of a third phase leg of the first DC-to-DC converter and the at least one energy storage module;

a fourth reactor connected between a center terminal of the first phase leg of the second DC-to-DC converter and the at least one energy storage module; and a control module configured to control (i) interleaved operation of switches of the first phase leg of the first DC-to-DC converter and switches of the second phase leg of the first DC-to-DC converter, and (ii) interleaved operation of switches of the third phase leg of the first DC-to-DC converter and switches of the first phase leg of the second DC-to-DC converter.

12. The conversion circuit of claim 1, further comprising:

a second DC-to-DC converter comprising a first phase leg and a second phase leg;

a third reactor connected between a first center terminal of the first phase leg of the second DC-to-DC converter and the at least one energy storage module;

a fourth reactor connected between a second center terminal of the second phase leg of the second DC-to-DC converter and the at least one energy storage module; and a control module configured to control (i) interleaved operation of switches of the first phase leg of the first DC-to-DC converter and switches of the second phase leg of the first DC-to-DC converter, and (ii) interleaved operation of switches of the first phase leg of the second DC-to-DC converter and switches of the second phase leg of the second DC-to-DC converter.

13. The conversion circuit of claim 1, further comprising:

a second DC-to-DC converter comprising a first phase leg and a second phase leg;

a third reactor connected between a first center terminal of the first phase leg of the second DC-to-DC converter and one or more additional energy storage modules; and a fourth reactor connected between a second center terminal of the second phase leg of the second DC-to-DC converter and the one or more additional energy storage modules, wherein the third reactor, the one or more additional energy storage modules and the fourth reactor are connected in series between the first center terminal of the first phase leg of the second DC-to-DC converter and the second center terminal of the second phase leg of the second DC-to-DC converter such that the second DC-to-DC converter has another virtual ground.

14. The conversion circuit of claim 13, further comprising a control module configured to control switches of the first phase leg and the second phase leg of the first DC-to-DC converter and control switches of the first phase leg and the second phase leg of the second DC-to-DC converter for staggered operation of the at least one energy storage module and the one or more additional energy storage modules.

15. The conversion circuit of claim 1, further comprising:

a second DC-to-DC converter comprising a phase leg, wherein the first DC-to-DC converter comprises a third phase leg;

a third reactor connected between a third center terminal of the third phase leg of the first DC-to-DC converter and one or more additional energy storage modules; and a fourth reactor connected between a center terminal of the phase leg of the second DC-to-DC converter and the one or more additional energy storage modules, wherein the third reactor, the one or more additional energy storage modules and the fourth reactor are connected in series between the third center terminal of the third phase leg of the first DC-to-DC converter and the center terminal of the phase leg of the second DC-to-DC converter to provide another virtual ground.

16. The conversion circuit of claim 15, further comprising a control module configured to control switches of the first phase leg, the second phase leg and the third phase leg of the first DC-to-DC converter and control switches of the phase leg and the second DC-to-DC converter for staggered operation of the at least one energy storage module and the one or more additional energy storage modules.

17. The conversion circuit of claim 1, further comprising:

a second DC-to-DC converter comprising a first phase leg;

a third DC-to-DC converter comprising a first phase leg;

a third reactor connected between a first center terminal of the first phase leg of the second DC-to-DC converter and one or more additional energy storage modules; and a fourth reactor connected between a first center terminal of the first phase leg of the third DC-to-DC converter and the one or more additional energy storage modules, wherein the third reactor, the one or more additional energy storage modules and the fourth reactor are connected in series between the first center terminal of the first phase leg of the second DC-to-DC converter and the first center terminal of the first phase leg of the third DC-to-DC converter to provide another virtual ground.

18. The conversion circuit of claim 17, further comprising a control module configured to control switches of the first phase leg and the second phase leg of the first DC-to-DC converter, control switches of the first phase leg of the second DC-to-DC converter, and control switches of the first phase leg of the third DC-to-DC converter for staggered operation of the at least one energy storage module and the one or more additional energy storage modules.

19. The conversion circuit of claim 17, further comprising a fifth reactor, wherein:

the second DC-to-DC converter comprises a second phase leg; and the fifth reactor is connected between a second center terminal of the second phase leg of the second DC-to-DC converter and the at least one energy storage module.

20. The conversion circuit of claim 19, further comprising a sixth reactor, wherein:

the second DC-to-DC converter comprises a third phase leg; and the sixth reactor is connected between a third center terminal of the third phase leg of the second DC-to-DC converter and the at least one energy storage module.

21. The conversion circuit of claim 19, further comprising a sixth reactor, wherein:

the third DC-to-DC converter comprises a second phase leg; and the sixth reactor is connected between a second center terminal of the second phase leg of the third DC-to-DC converter and the at least one energy storage module.

22. A conversion circuit comprising:

a direct current (DC) link including a plurality of DC link rails;

a first DC-to-DC converter comprising a first phase leg;

a second DC-to-DC converter comprising a first phase leg;

a first reactor connected between a first center terminal of the first phase leg of the first DC-to-DC converter and at least one energy storage module; and a second reactor connected between a first center terminal of the first phase leg of the second DC-to-DC converter and the at least one energy storage module, wherein the first reactor, the at least one energy storage module and the second reactor are connected in series between the first center terminal of the first phase leg of the first DC-to-DC converter and the first center terminal of the first phase leg of the second DC-to-DC converter such that the conversion circuit has a virtual ground.

23. The conversion circuit of claim 22, further comprising a third reactor, wherein:

the first DC-to-DC converter comprises a second phase leg; and the third reactor is connected between a second center terminal of the second phase leg of the first DC-to-DC converter and the at least one energy storage module.

24. The conversion circuit of claim 23, further comprising a fourth reactor, wherein:

the first DC-to-DC converter comprises a third phase leg; and the fourth reactor is connected between a third center terminal of the third phase leg of the first DC-to-DC converter and the at least one energy storage module.

25. The conversion circuit of claim 23, further comprising a fourth reactor, wherein:

the second DC-to-DC converter comprises a second phase leg; and the fourth reactor is connected between a second center terminal of the second phase leg of the second DC-to-DC converter and the at least one energy storage module.

26. The conversion circuit of claim 22, further comprising:

a third DC-to-DC converter comprising a first phase leg and a second phase leg;

a third reactor connected between a first center terminal of the first phase leg of the third DC-to-DC converter and one or more additional energy storage modules; and a fourth reactor connected between a second center terminal of the second phase leg of the third DC-to-DC converter and the one or more additional energy storage modules, wherein the third reactor, the one or more additional energy storage modules and the fourth reactor are connected in series between the first center terminal of the first phase leg of the third DC-to-DC converter and the second center terminal of the second phase leg of the third DC-to-DC converter such that the third DC-to-DC converter has another virtual ground.

27. The conversion circuit of claim 26, further comprising a control module configured to control switches of the first phase leg of the first DC-to-DC converter, control switches of the first phase leg of the second DC-to-DC converter, and control switches of the first phase leg and the second phase leg of the third DC-to-DC converter for staggered operation of the at least one energy storage module and the one or more additional energy storage modules.

28. The conversion circuit of claim 22, wherein:

the virtual ground is at a voltage potential between voltage potentials of the plurality of DC link rails; and the DC link rails are not connected to a ground reference terminal.

29. The conversion circuit of claim 22, wherein the virtual ground is not at a voltage potential of a chassis ground.

30. The conversion circuit of claim 22, wherein the virtual ground refers to a voltage potential between at least one of (i) voltage potentials of the plurality of DC link rails, or (ii) positive and negative voltage potentials of the at least one energy storage module.

31. The conversion circuit of claim 22, wherein:

the first reactor is connected between the first center terminal of the first phase leg of the first DC-to-DC converter and a group of energy storage modules, the group of energy storage modules comprising the at least one energy storage module;

the second reactor is connected between the first center terminal of the first phase leg of the second DC-to-DC converter and the group of energy storage modules; and the first reactor, the group of energy storage modules and the second reactor are connected in series between the first center terminal of the first phase leg of the first DC-to-DC converter and the first center terminal of the first phase leg of the second DC-to-DC converter.

32. The conversion circuit of claim 31, wherein:

the group of energy storage modules comprises a first energy storage module and a second energy storage module connected in series;

the virtual ground is at a voltage potential equal to a voltage potential of a connection point between the first energy storage module and the second energy storage module; and the connection point is not connected to a reference ground terminal.

33. The conversion circuit of claim 22, wherein:

the first phase leg of the first DC-to-DC converter comprises a first set of serially connected switch-diode pairs; and the first phase leg of the second DC-to-DC converter comprises a second set of serially connected switch-diode pairs.

34. The conversion circuit of claim 22, wherein each of the first DC-to-DC converter and the second DC-to-DC converter is implemented as a 2-level buck-boost DC-to-DC converter.

35. The conversion circuit of claim 22, further comprising a control module, a third reactor and a fourth reactor, wherein:

the first DC-to-DC converter comprises a second phase leg;

the second DC-to-DC converter comprising a second phase leg;

the third reactor connected between a second center terminal of the second phase leg of the first DC-to-DC converter and the at least one energy storage module;

the fourth reactor connected between the second center terminal of the second phase leg of the second DC-to-DC converter and the at least one energy storage module; and the control module configured to control (i) interleaved operation of switches of the first phase leg of the first DC-to-DC converter and switches of the first phase leg of the second DC-to-DC converter, and (ii) interleaved operation of switches of the second phase leg of the first DC-to-DC converter and switches of the second phase leg of the second DC-to-DC converter.

36. The conversion circuit of claim 22, further comprising:

the first DC-to-DC converter comprises a second phase leg and a third phase leg;

a third reactor connected between a second center terminal of the second phase leg of the first DC-to-DC converter and the at least one energy storage module;

a fourth reactor connected between a third center terminal of the third phase leg of the first DC-to-DC converter and the at least one energy storage module; and a control module configured to control (i) interleaved operation of switches of the first phase leg of the first DC-to-DC converter and switches of the third phase leg of the first DC-to-DC converter, and (ii) interleaved operation of switches of the second phase leg of the first DC-to-DC converter and switches of the first phase leg of the second DC-to-DC converter.

* * * * *